US012695508B2

(12) United States Patent
Rojas-Cessa et al.

(10) Patent No.: US 12,695,508 B2
(45) Date of Patent: Jul. 28, 2026

(54) SYSTEM AND METHOD OF HIGH-SPEED WIRELESS COMMUNICATIONS USING REFLECTED LASER LIGHT

(71) Applicant: New Jersey Institute of Technology, Newark, NJ (US)

(72) Inventors: Roberto Rojas-Cessa, Brooklyn, NY (US); Paa Kwesi Esubonteng, Irvington, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 216 days.

(21) Appl. No.: 18/383,244

(22) Filed: Oct. 24, 2023

(65) Prior Publication Data

US 2024/0154698 A1     May 9, 2024

Related U.S. Application Data

(60) Provisional application No. 63/418,848, filed on Oct. 24, 2022.

(51) Int. Cl.
H04B 10/112 (2013.01)
H04B 10/118 (2013.01)
(Continued)

(52) U.S. Cl.
CPC ......... H04B 10/118 (2013.01); H04B 10/112 (2013.01); H04B 10/29 (2013.01); H04B 10/503 (2013.01)

(58) Field of Classification Search
CPC ........................................ H04B 10/112–1129
See application file for complete search history.

(56) References Cited

U.S. PATENT DOCUMENTS

| | | | | |
|---|---|---|---|---|
| 10,371,935 B1 * | 8/2019 | Patel | .................. | G02B 26/0875 |
| 11,418,256 B1 * | 8/2022 | Mellon | ................ | H04B 10/524 |

(Continued)

OTHER PUBLICATIONS

P. K. Esubonteng and R. Rojas-Cessa, "Orientation of a diffuse reflector for improved coverage in ID-FSOC for vehicular communications", Veh. Commun., vol. 36, Aug. 2022, [online] Available: https://www.sciencedirect.com/science/article/pii/ S2214209622000407. 13 pgs.

(Continued)

*Primary Examiner* — Nathan M Cors
(74) *Attorney, Agent, or Firm* — Lerner David LLP

(57) ABSTRACT

Disclosed is a drone-assisted and non-drone assisted NLoS-FSOC network and method for high-speed communications in disaster-struck areas or where there is little or no communications. NLoS-FSOC uses a diffuse reflector that is in LoS of a transmitter and receiver for establishing a broadcast optical channel. NLoS-FSOC establishes uplink and downlink transmissions. The present disclosure services at least 130% more stations and provides at least 100% more aggregated downlink data rates than drone-assisted than RF-based schemes. It also consumes 116 times less energy compared to RF-based schemes by using high-bandwidth optical signals and coherent light of laser light in NLoS-FSOC, optical broadcast channel use, and drone or non-drone front-haul diffuse reflection placement. The present disclosure is used autonomously or in combination with other systems such as RF schemes for a more robust solution to RF schemes alone.

3 Claims, 13 Drawing Sheets

Proposed network with NLoS-FSOC at back-and front-haul.

US 12,695,508 B2

Page 2

(51) Int. Cl.
H04B 10/29 (2013.01)
H04B 10/50 (2013.01)

(56) References Cited

U.S. PATENT DOCUMENTS

| 2004/0129865 A1* | 7/2004 | Doane | H04B 10/112 |
| | | | 250/216 |
| 2004/0264972 A1* | 12/2004 | Killinger | H04B 10/1141 |
| | | | 398/130 |
| 2011/0116805 A1* | 5/2011 | Xia | H04B 10/1121 |
| | | | 398/131 |
| 2016/0294472 A1* | 10/2016 | Palmer | H04B 7/0617 |
| 2021/0234592 A1* | 7/2021 | Ashrafi | H01Q 21/065 |
| 2021/0384971 A1* | 12/2021 | Hashimoto | H04B 10/112 |
| 2023/0327321 A1* | 10/2023 | Sekiguchi | H01Q 21/06 |
| | | | 343/702 |
| 2025/0192885 A1* | 6/2025 | Warden | H04B 10/60 |

OTHER PUBLICATIONS

Y. Kaymak, et al., "A Survey on Acquisition, Tracking, and Pointing Mechanisms for Mobile Free-Space Optical Communications," in IEEE Communications Surveys & Tutorials, vol. 20, No. 2, Feb. 2018. 20 pgs.

Esubonteng, P.K. et al., "Orientation of a diffuse reflector for improved coverage in ID-FSOC for vehicular communications" Vehicular Communications, Aug. 2022, pp. 1-13, vol. 36.

Kaymak Y. et al., "A Survey on Acquisition, Tracking, and Pointing Mechanisms for Mobile Free-Space Optical Communications," IEEE Communications Surveys & Tutorials, Feb. 2018, vol. 20, No. 2, pp. 1-20.

Yun, G. et al., "Indoor infrared wireless communications using spot diffusing and fly-eye receivers" IEEE, Oct. 1993, pp. 151-157, vol. 18, Issue 4.

Shi, W. et al., "Multiple Drone-Cell Deployment Analyses and Optimization in Drone Assisted Radio Access Networks" IEEE Access, Invited Paper, Feb. 2018, pp. 12518-12529, vol. 6.

Esubonteng, P.K. et al., "Stream: Medium Access Control With Station Presence Awareness in Crowded Networks" IEEE Systems Journal, Dec. 2021, pp. 5152-5161, vol. 15, No. 4.

Nelson, C. B. et al., "The Evolution of Hastily Formed Networks for Disaster Response" Technologies, Case Studies, and Future Trends, IEEE Global Humanitarian Technology Conference, Oct. 2011, pp. 467-475.

Fawaz, W. et al., "UAV-Aided Cooperation for FSO Communication Systems" Amateur Drone Surveillance: Applications, Architectures, Enabling Technologies, and Public Safety Issues, Jan. 2018, IEEE Communications Magazine, pp. 70-75.

Zeng, Y. et al., "Wireless Communications with Unmanned Aerial Vehicles: Opportunities and Challenges" Wireless Communications, Networking, and Positioning with UAVs, IEEE, May 2016, pp. 36-42.

Wu, D. et al., "An FSO-Based Drone Assisted Mobile Access Network for Emergency Communications" IEEE Transactions on Network Science and Engineering, Sep. 2020, pp. 1597-1606, vol. 7, No. 3.

Ashraf, U. et al., "WiMesh: leveraging mesh networking for disaster communication in resource-constrained settings" Springer, Apr. 2021, pp. 2785-2812.

Ghafoor, S. et al., "Cognitive Radio for Disaster Response Networks: Survey, Potential, and Challenges" Accepted From Open Call, IEEE Wireless Communications, Oct. 2014, pp. 70-80.

Esubonteng, P.K. et al., "Star: a carrier sense agnostic MAC scheme for a crowded NLoS-FSOC optical LAN" Journal of Optical Communications and Networking Oct. 2022, pp. 815-827.

Boccardo, P. et al., "UAV Deployment Exercise for Mapping Purposes: Evaluation of Emergency Response Applications" Sensors, Open Access, Jul. 2015, pp. 15717-15737.

Saputro, N. et al., "Drone-assisted Multi-purpose Roadside Units for Intelligent Transportation Systems" IEEE Xplore, Aug. 2018, pp. 1-5.

Chen, T. et al., " Resource Allocation in Drone-Assisted Emergency Communication Systems" IEEE Xplore, Aug. 2020, pp. 1-6.

Qin, Z. et al., "Trajectory Planning for Reconnaissance Mission Based on Fair-Energy UAVs Cooperation" IEEE Access, Jul. 2019, pp. 91120-91133, vol. 7.

Xiao, Y. et al., "On Optimizing Backoff Counter Reservation and Classifying Stations for the IEEE 802.11 Distributed Wireless LANs" EEE Transactions on Parallel and Distributed Systems, Jul. 2006, pp. 713-722. vol. 17, No. 7.

Janecek, M. et al., "Optical Reflectance Measurements for Commonly Used Reflectors" IEEE Transactions on Nuclear Science, Aug. 2008, pp. 2432-2437, vol. 55, No. 4.

Ran, Y. "Considerations and Suggestions on Improvement of Communication Network Disaster Countermeasures after the Wenchuan Earthquake" Network Disaster Recovery, Jan. 2011, pp. 44-47.

Chand, G.S.L.K et al"Drone Based Wireless Mesh Network for Disaster/Military Environment" Journal of Computer and Communications, Scientific Research Publishing, Apr. 2018, pp. 44-52, vol. 6.

Yao J. et al., "Deep characteristics analysis on travel time of emergency traffic" TUDelft University of Technology, International Journal of Computational Science and Engineering, May 2020, pp. 1-16.

Tuna, G. et al., "Unmanned aerial vehicle-aided communications system for disaster recovery" Journal of Network and Computer Applications, Elsevier, Oct. 2013, pp. 27-36, vol. 41.

Gholami, A. et al., "Drone-Assisted Communications for Remote Areas and Disaster Relief" arXiv: 1909.02150Å [eess.SP] Sep. 2019, pp. 1-2.

Wang, Z. et al., "Adaptive Deployment for UAV-Aided Communication Networks", IEEE Transactions on Wireless Communications, Sep. 2019, pp. 4531-4543, vol. 18, No. 9.

Shabana, S. et al., "Review on MANET Based Communication for Search and Rescue Operations", Wireless Personal Communication, Springer Link, Dec. 2015, pp. 31-52, vol. 94.

Gray, J.J. et al., "Johann Heinrich Latibert, Mathematician and Scientist, 1728-1777", Historia Mathematica, Feb. 1978, pp. 13-41. vol. 5, Issue 1.

Song, Y. et al., "Multiple Multidimensional Knapsack Problem and Its Applications in Cognitive Radio Networks", IEEE Xplore, Jan. 2009, pp. 1-7.

Erdelj, M. et al., "Help from the Sky: Leveraging UAVs for Disaster Management" Drones, IEEE Pervasive Computing, Jan. 2017, pp. 24-32, vol. 16, Issue 1.

Cao, Z. et al., "Reconfigurable beam system for non-line-of-sight free-space optical communication" Light: Science & Applications, Jul. 2019, pp. 1-9.

Galkin, B. et al., "Backhaul For Low-Altitude UAVs in Urban Environments" IEEE International Conference on Communications (ICC), May 2018, pp. 1-6.

Hayajneh, A. et al., "Performance Analysis of UAV Enabled Disaster Recovery Networks: A Stochastic Geometric Framework Based on Cluster Processes" IEEE Access, May 2018, pp. 26215-26230, vol. 6.

Bhuiyan, N.N. et al., "Traffic-load Aware Spectrum Allocation in Cloud Assisted Cognitive Radio Networks" IEEE Region 10 Humanitarian Technology Conference, Dec. 2017, pp. 598-601.

Inoue, M. et al., "NerveNet: A Regional-Area Network for Resilient Local Information Sharing and Communications" Second International Symposium on Computing and Networking, IEEE, Dec. 2014, pp. 3-6.

Zhao, Z. et al., "200 GB/s FSO WDM Communication System Empowered by Multiwavelength Directly Modulated TOSA for 5G Wireless Networks" Open Access, IEEE Photonics Journal, Aug. 2018, pp. 1-9, vol. 10, No. 4.

Alzenad, M. et al., "3-D Placement of an Unmanned Aerial Vehicle Base Station for Maximum Coverage of Users With Different QoS Requirements" IEEE Wireless Communications Letters, Feb. 2018, pp. 38 41, vol. 7, No. 1.

(56)                    References Cited

OTHER PUBLICATIONS

Li, X. "Deployment of Drone Base Stations for Cellular Communication Without Apriori User Distribution Information" Proceedings of the 37th Chinese Control Conference, Jul. 2018, pp. 7274-7281.

Bogle, et al., "The Case for Drone-assisted Emergency Response to Cardiac Arrest" HHS Public Access, Nov. 2019, pp. 1-17.

Cho, J. W. et al., "Performance Comparison of Heuristic Algorithms for UAV Deployment with Low Power Consumption" International Conference on Information and Communication Technology Convergence (ICTC), Oct. 2018, pp. 1067-1069.

Janecek, M. "Reflectivity Spectra for Commonly Used Reflectors" IEEE Transactions on Nuclear Science, Jun. 2012, pp. 490-497, vol. 59, No. 3.

Patricelli, F. et al., "Disaster management and mitigation: the telecommunications infrastructure" Free Access, Disasters, Wiley Online Library, Dec. 2008, pp. 24-37.

Wu, D. et al., "Optimisation of Lambertian Order for Indoor Non-directed Optical Wireless Communication" IEEE International Conference on Communications in China Workshops, Aug. 2012, pp. 43-48.

Kim, I. I. et al., "Comparison of laser beam propagation at 785 nm and 1550 nm in fog and haze for optical wireless communications" SPIE Digital Library, Feb. 2001, pp. 1-12.

Sorensen, L.Y et al., "Low Cost and Flexible UAV Deployment of Sensors" Sensors, MDPI, Jan. 2017, pp. 1-13, vol. 17, Issue 1.

Safi, H. et al., "Spatial Beam Tracking and Data Detection for an FSO Link to a UAV in the Presence of Hovering Fluctuations" >eess>arXiv: 1904.03774,Apr. 2019, pp. 1-27.

Hamza, A. et al., "Classification Framework for Free Space Optical Communication Links and Systems" IEEE Communications Surveys & Tutorials, Oct. 2018, pp. 1346-1382, vol. 21, No. 2.

Zvikhachevskaya, A. et al., "Quality of Service consideration for the wireless telemedicine and e-health services" IEEE Conference on Wireless Communications and Networking, Apr. 2009, pp. 1-6.

Maza I. et al., "Multi-UAV Cooperation and Control for Load Transportation and Deployment" Springer Link, Aug. 2009, pp. 417-449.

Kaymak, Y. et al., "Indirect Diffused Light Free-Space Optical Communications for Vehicular Networks" IEEE Communications Letters, May 2019, pp. 814-817, vol. 23, No. 5.

* cited by examiner

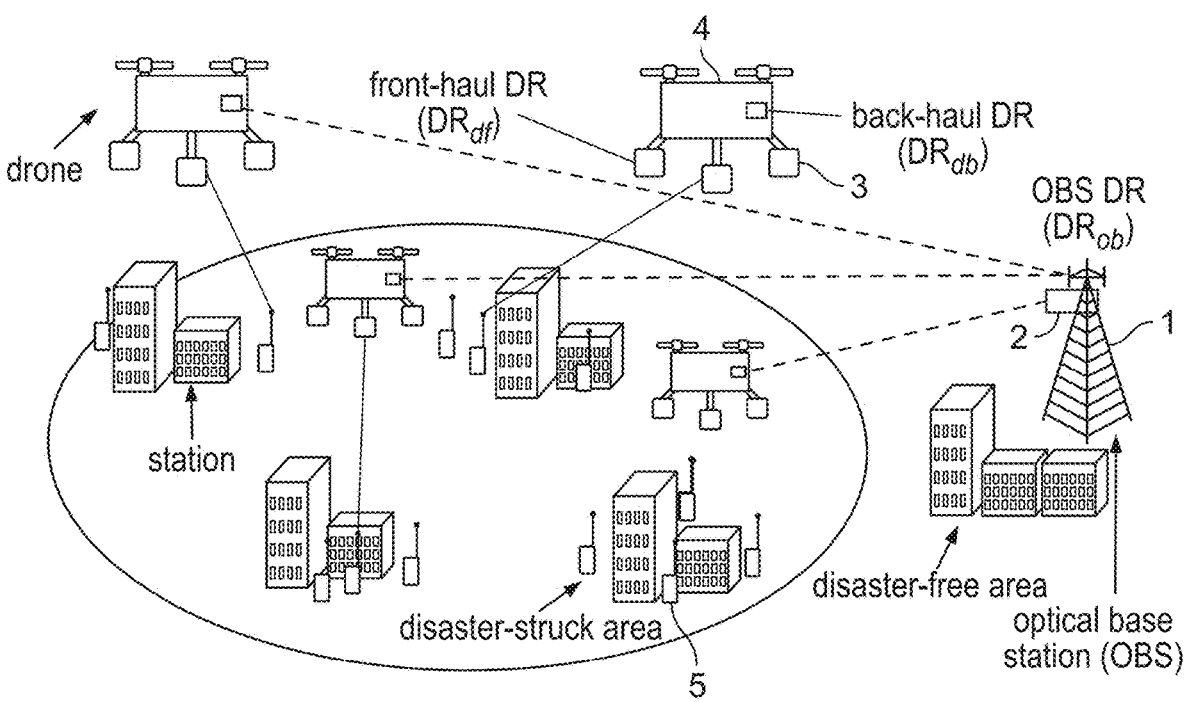
Fig. 1, Proposed network with NLoS-FSOC at back-and front-haul.
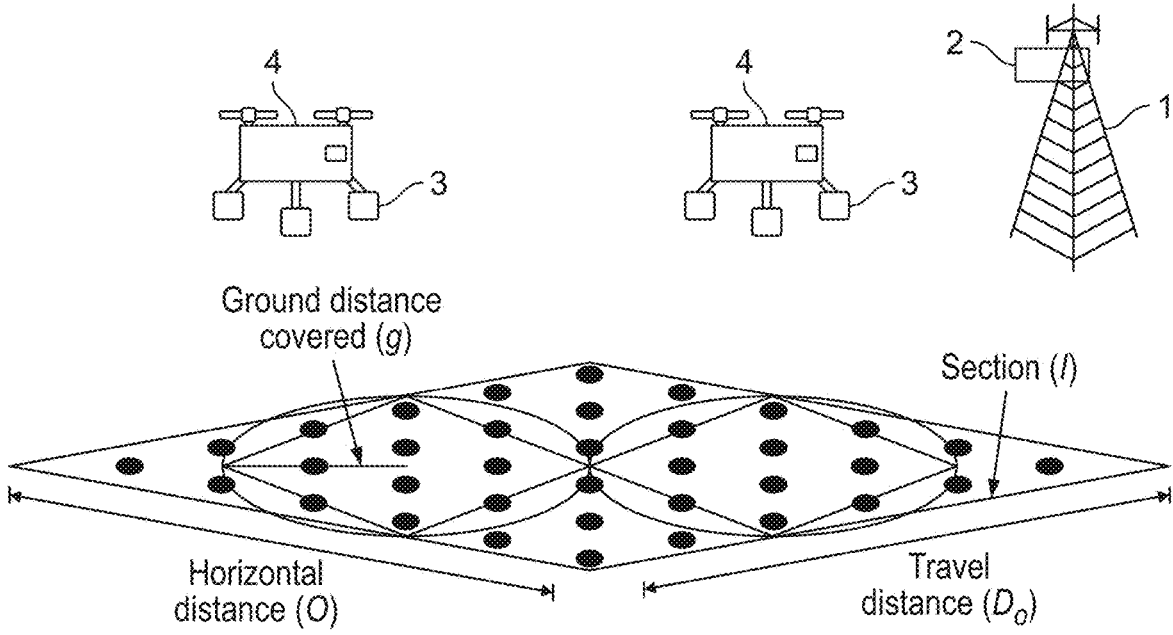
Fig. 2, An example of a disaster-struck area divided into sections.

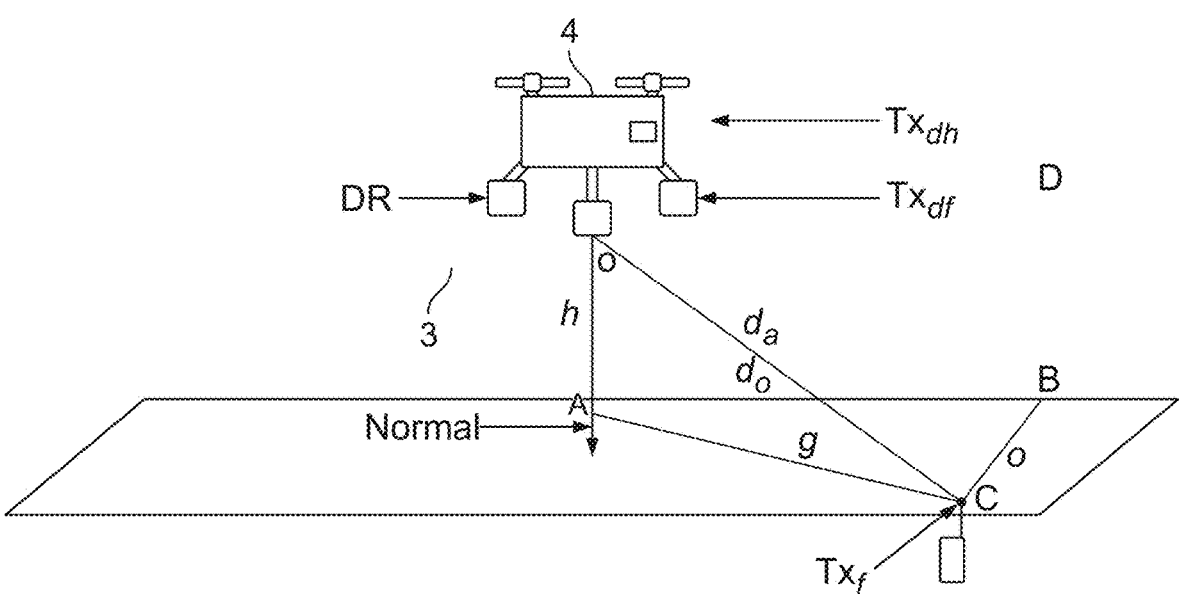
Fig. 3, An uplink transmission from station to the $DR_{df}$.
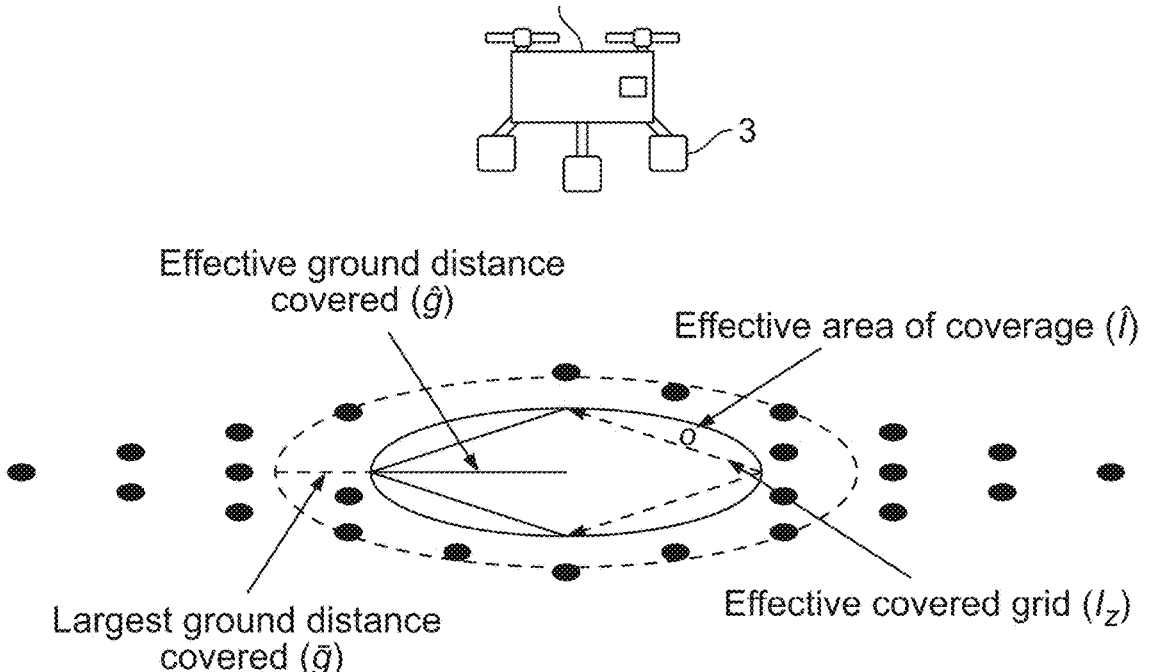
Fig. 4, Pictorial definition of the effective ground distance $\hat{g}$, the effective covered grid $I_z$ and the effective area of coverage $I$.

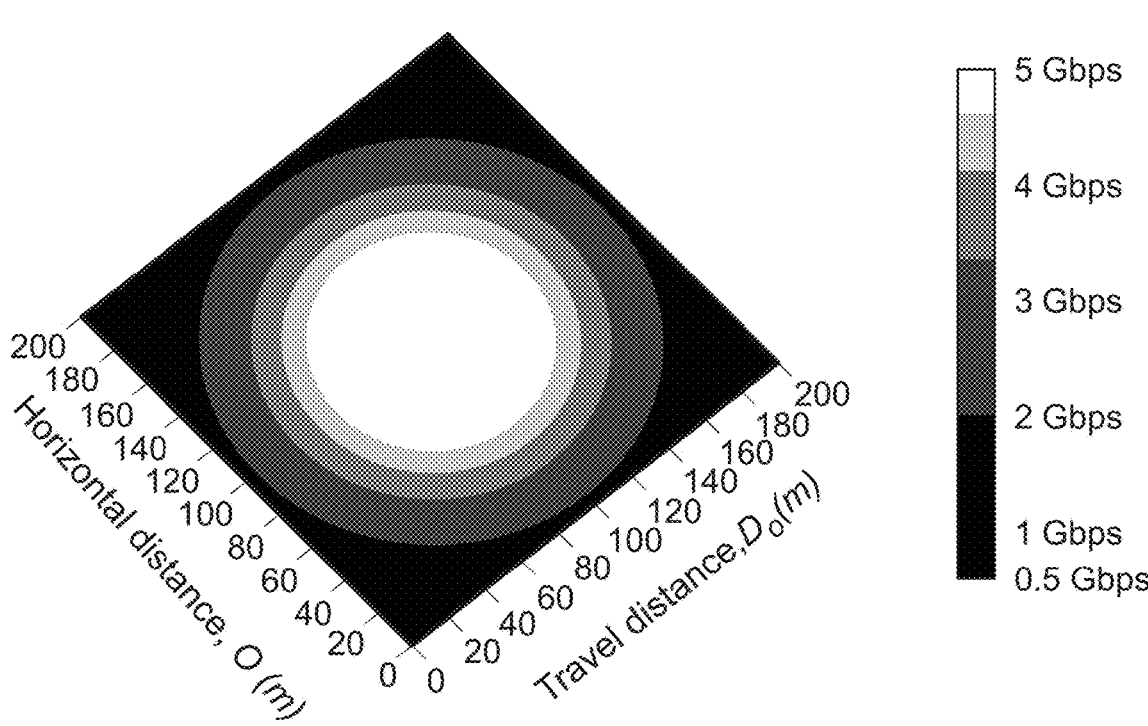
Fig. 5, An example of the distribution of the $B_{lz}$ for $h$ =40 m.
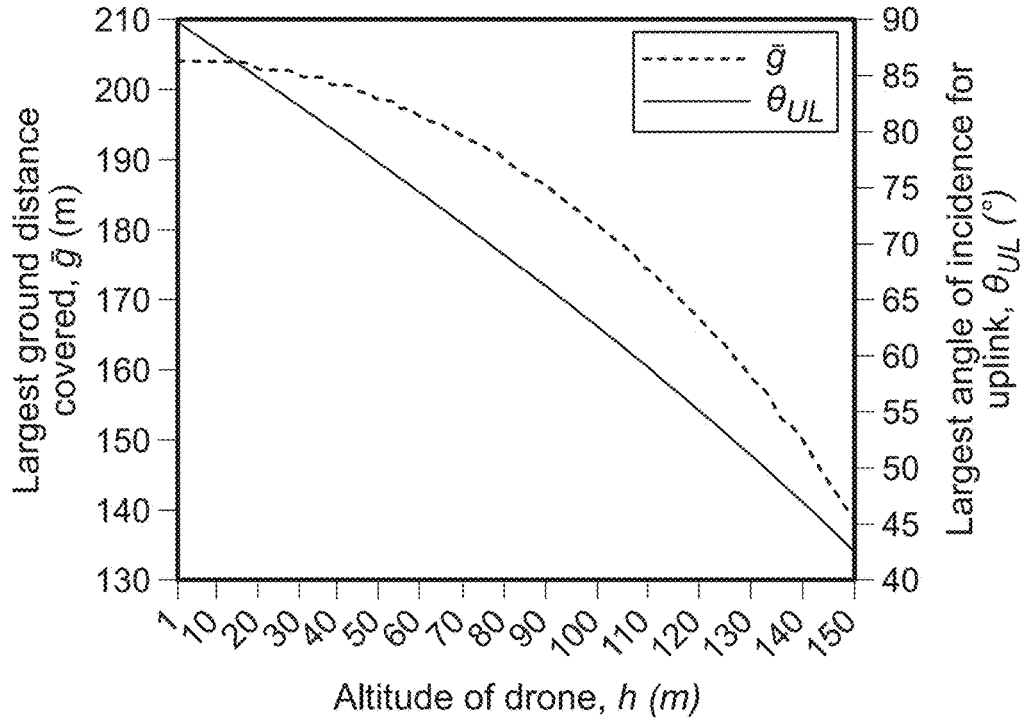
Fig. 6(a)

Figs. 6a-6c Effect of $h$ on $\bar{g}$, $\theta_{UL}$, $P_{UL}$ and $N_L$ Fig. 6(a) $\bar{g}$ and the largest uplink angle of incidence $\theta_{UL}$ as a function of $h$, Fig. 6(b) the smallest uplink received power $P_{UL}$ as a function of $h$, and Fig. 6(c) number of drones $N_z$ needed as a function of $h$.

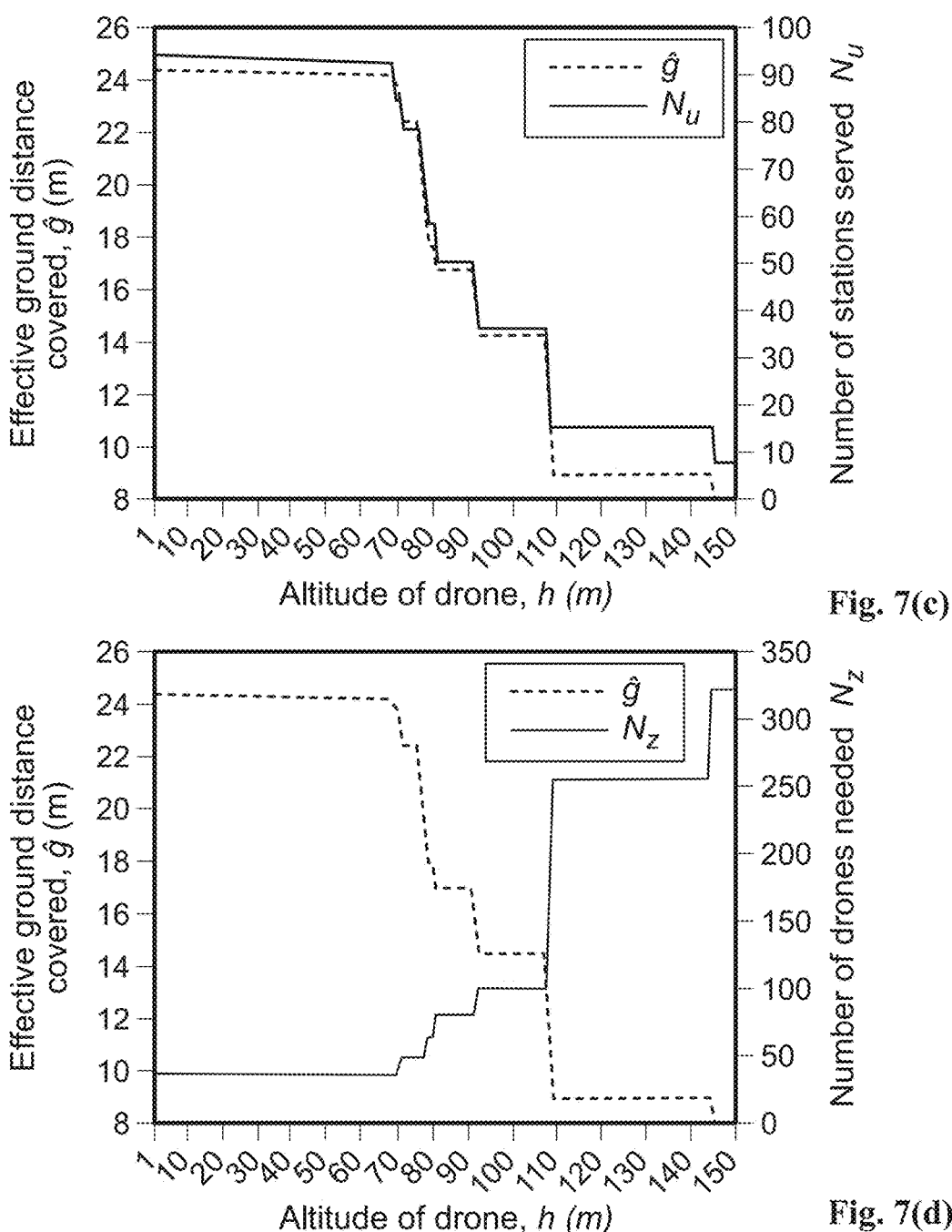

Figs. 7a-7d. Effect of the drone's altitude $h$ on $g^{\wedge}$, $\theta_{UL}$, $P_{UL}$, $N_u$ and $N_z$, Fig. 7(a) Effective ground distance $g^{\wedge}$ and the largest uplink angle of incidence $\theta_{UL}$ as a function of $h$, Fig. 7(b) The smallest uplink received power $P_{UL}$ as a function of $h$, Fig. 7(c) Number of stations served $N_u$ as a function of $h$, and Fig. 7(d) Required number of drones, $N_z$ as a function of $h$ for coverage on the whole disaster-struck area.

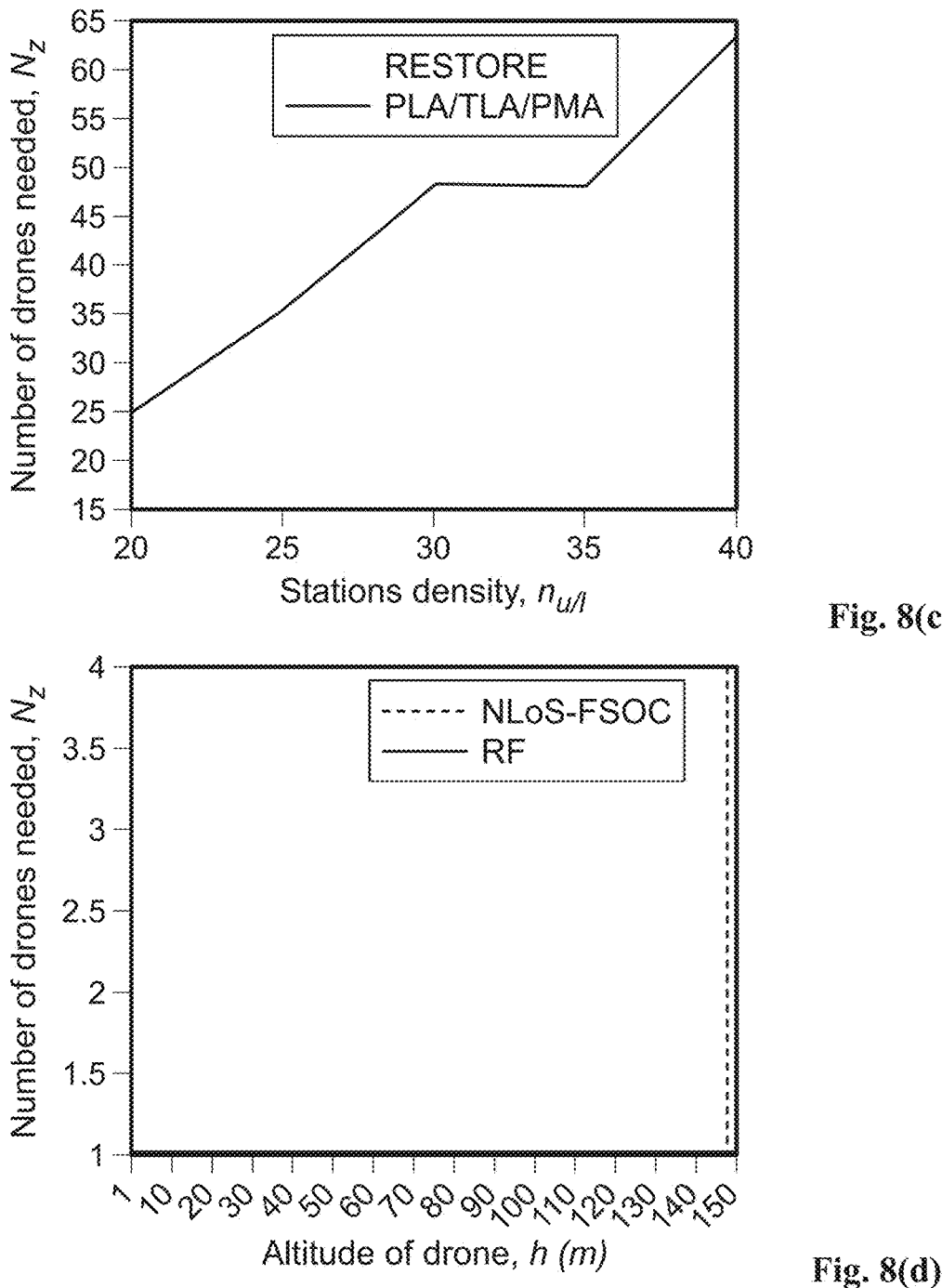

Figs. 8a-8d. Comparison of the largest covered ground distance covered and the number of drones required to cover the whole disaster-struck area: Fig. 8(a) $g\hat{}$ as a function of $u_{nl}$, Fig. 8(b) $g\bar{}$ as a function of $h$, Fig.8(c) required number of drones, $N_z$ using $g\hat{}$ of the data in Figure 8a, and the required number of drones, $N_z$, using $g\bar{}$ of the data in Figure 8b, Fig. 8(d) is number of drones needed as related to altitude of drone.

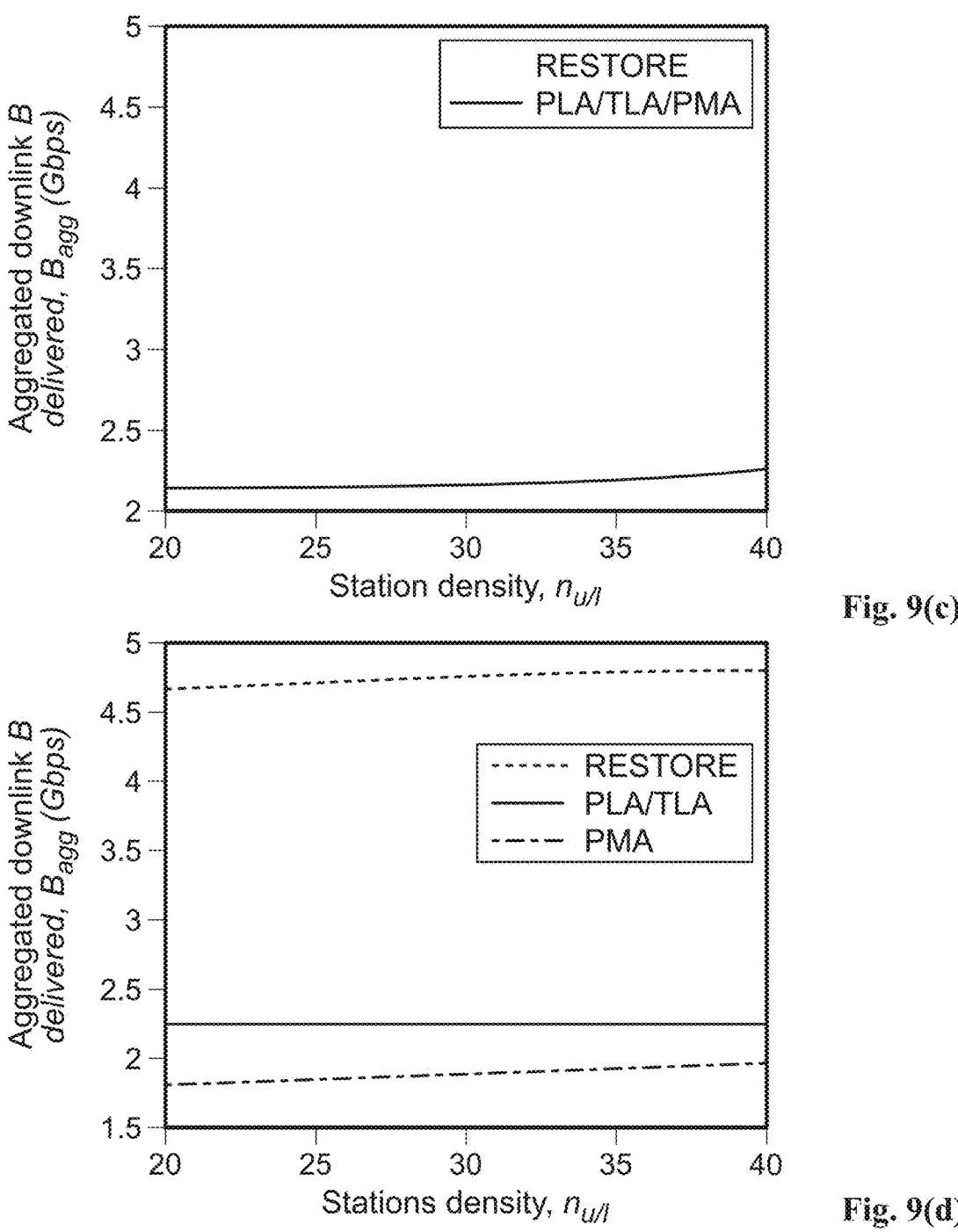

Fig. 9a-9d. Comparison of $N_u$ served and the aggregated $B_{Dl}$ ($B_{agg}$) delivered by the drone: Fig. 9(a) Number station served within $\hat{g}$ as a function of $n_{ul}$, Fig. 9(b) number stations served within $\hat{g}$ as a function of $n_{ul}$, Fig. 9(c) aggregated downlink $B$ delivered $B_{agg}$ within $\hat{g}$ as a function of $n_{ul}$, and Fig. 9(d) aggregated downlink $B$ delivered $B_{agg}$ within $\hat{g}$ as a function of $n_{ul}$.

Fig. 10a-10b. A comparison of the total energy consumed by the drone during downlink transmission:

Fig. 10(a) Total energy consumed by drone serving $g^\wedge$ and

Fig. 10(b) Total energy consumed by drone serving $g^-$.

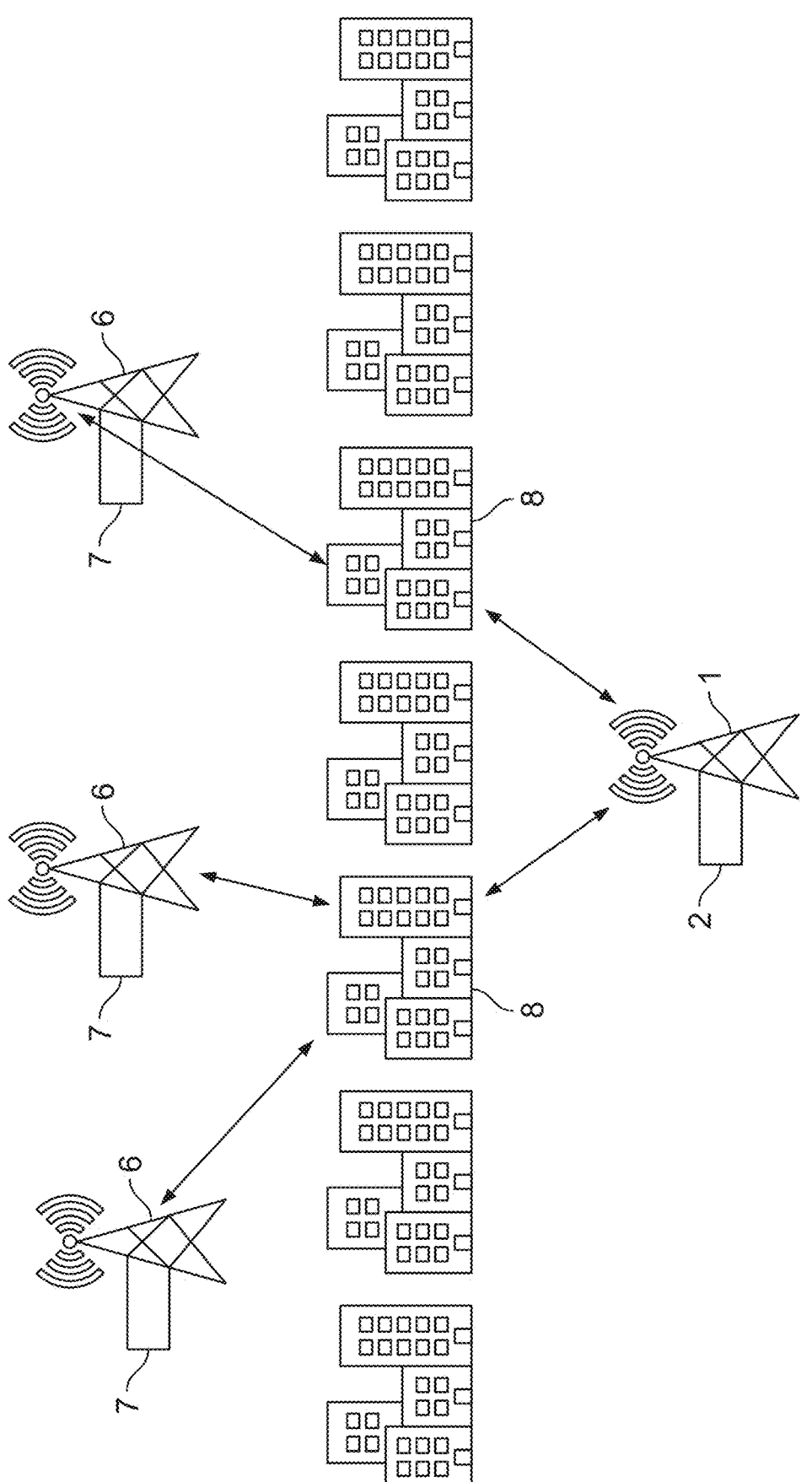
Fig.11. Proposed network with diffuse reflector and without drones.

Drone with two diffuse reflectors

14 Drone

18 First diffuse reflector (back side)

17 First receiver

16 Reflected light beam

15 Laser light emitter (second transmitter)

18 First diffuse reflector (front side)

104 Second diffuse reflector

Second receiver 13

12 First transmitter

Reflected light beam

SYSTEM AND METHOD OF HIGH-SPEED WIRELESS COMMUNICATIONS USING REFLECTED LASER LIGHT

CROSS-REFERENCE TO RELATED APPLICATIONS

This application claims the benefit of the filing date of U.S. Provisional Patent Application No. 63/418,848 filed Oct. 24, 2022, the disclosure of which is hereby incorporated herein by reference.

FIELD OF THE DISCLOSURE

The present disclosure relates to a system and a method to communicate wirelessly by diffuse reflections of laser light in a broadcast optical channel. In particular, the present disclosure relates to high-speed wireless communication using diffuse reflectors with drone and without drones.

BACKGROUND OF THE INVENTION

Natural disasters occur in very large areas on a large scale causing life and property damage on an uncontrollable scale. In addition, human-induced disasters such as gas explosion, radioactive leakage of nuclear power plants, or subway fires are also manifesting in various forms, resulting in massive human and property damage. In case of natural or man-made disasters, communication technology can quickly collect on-site information about the affected area, and promptly respond and provide on-site control of the disaster site. Large-scale disasters can quickly disrupt communications at disaster sites. In such situations, information about the disaster site is vital to be collected quickly, and also the mutual communication between disaster control agencies and the on-site command control of the disaster is required. As a result, disruption of communication due to the disaster causes considerable issues for rescue and recovery teams.

Therefore, communications for emergency responses face challenges not only in operational logistics, but also in the deployment, operational lifetime, reliability, and bandwidth provisioning. Flying drones or unmanned aerial vehicles are highly maneuverable and a cost-effective solution to monitor or carry payloads to remote places. The application of drones is rapidly growing in the service delivery market as they can provide fast transportation and high reachability, especially for hard-to-access areas. They are becoming increasingly relevant for carrying communications equipment for emergency response and recovery operations [1]-[3]. Examples of these uses are the extension of wireless communications range to help stranded people [2]-[4] and first responders [3], [5]-[7], mapping geographical areas [8], performing reconnaissance tasks [9], and the delivery of goods and medical aid to inaccessible areas [10]. Drone deployment is cost-effective when used for temporary service provisioning where the consideration of deploying a permanent infrastructure is infeasible [11].

Existing approaches use drones in diverse manners, but the common denominator is the adoption of radio frequency (RF) communications. Its robustness and the lack of another approach make RF communications the uncontested solution of choice. However, the flying time of a drone and the available bandwidth continues to remain limited, and that limits the scope and duration of the rescue and recovery operations. Thus using drones as a medium for linking a RF signal has significant drawbacks.

Drones have been deployed to extend communications range in different critical operations [24]-[26]. The drone deployment problem on disaster-struck areas is mainly divided into two categories: a) finding the drone's optimal location and altitude to maximize the coverage of the network [1], [7] and b) determining the bandwidth or time location scheme to maximize the network usage [3], [7], [27], [28]. Alzenad et al. [1] and Wu et al. [7]proposed algorithms that determine the operation height of a drone in an urban area to maximize the number of users that receive data through the drone. Cicek et al. [3] considered a drone placement and bandwidth allocation problem that maximizes the total profit generated by the supplementary coverage during peak periods in an urban environment.

Recently, some other investigators suggested drone coverage with either Free Space Optical Communication (FSOC) [29], [30] or RF [3], [31], [32] communications at the back-haul, that is, between the drone and the ground base stations. As an alternative to the limited capacity for data transmission of radio-frequency links, FSOC links have been considered [33], [34]. However, the drone has to establish point-to-point Free Space Optical (FSO) links with users to maximize utilization of the FSO back-haul. This is a challenging task because the drone would need to carry and energize a large number of transceivers or take a very large amount of time for performing alignment of the transceivers and to provide access time to each user.

Kaymak et al. [15]proposed a system for a Nondirect Line-of-Sight Free-Space Optical Communications (NLoS-FSOC) for vehicular networks, where Diffuse Reflectors (DR) are placed in the vicinity of vehicles and of the optical base stations (OBS). The reported data rate is estimated between 0.3 and 1 Gbps. Cao et al. [35]proposed spatially shaping the wavefront of the modulated light toward the DR using a coherent array optical transmitter. They showed an increase of more than 20 dB in the intensity of the received light from the DR at the receiver collimator. However the systems in Kaymak and Cao still have disadvantages and limitations. Both systems utilize considerable power and do not support large data rates with multiple uses in a coverage area.

While solutions based on flight path optimization and serving policies to energy-limited approaches abound, the practical adoption of drone-assisted or non-drone assisted communications for recovery operations and other tasks requires a ground-breaking leap on operational time improvement.

BRIEF SUMMARY

Disclosed is a newly developed system and method that utilizes diffuse reflections (DR) of laser light for high-speed communications relay. The relay may be used in a disaster area or other area where higher speed communication is required. Compared to the above prior attempts, the presently disclosed system and method solves the problems of current state of the art, meets the above requirements, and provides many more benefits.

In accordance with embodiments of the present disclosure, exemplary systems and methods are provided for high-speed communications for relay using diffuse reflections of laser light. In one embodiment, a drone could be used. In another embodiment, a method to make a fixed network for emergency notifications without the use of a drone is disclosed. In another embodiment, a method is provided for high-speed communications for vehicle networks.

In one embodiment, a method is provided for non-direct line-of-sight free-space optical communications (NLoS-FSOC) as a broadcast optical channel that enables communications to stations stranded in a disaster-struck area. NLoS-FSOC is a laser-light-based communications paradigm that could use a diffuse reflector (DR) as the broadcast ground where stations establish optical links as a natural optical local area network (OLAN). In this OLAN, stations with line-of-sight (LoS) to the DR can transmit to all other stations or receive a signal from all other stations [12]-[15]. Table I provides a summary of works that provide communications to disaster-struck areas using drones and different link technologies.

TABLE I

ACCESS POINTS USED TO PROVIDE WIRELESS
COMMUNICATION IN DISASTER-STRUCK AREAS

| Access via | Deployment Strategy | Front-haul | Back-haul |
|---|---|---|---|
| Satellite | Fixed antenna [16], [17], Van [18], Helicopter [16] | RF | RF |
| WiMAX, WiFi | Fixed antenna [17], [19], [20] | RF | RF, Fiber |
| Cell phones | People [3], [21], Fixed antenna [20] | RF | RF, FSO |
| Radio base station | Fixed antenna [20], [22], van [22], UAV [23] | RF | RF, FSO |
| FSO interface | UAV (this work) | NLoS-FSO | NLoS-FSO |

In one embodiment, a system could include NLoS-FSOC used in combination with a drone that relays transmissions between stations in a disaster-struck area and a remote ground optical base station (OBS) that provides network access. A drone placement and access time allocation for disaster rescue (RESTORE) algorithm is disclosed to identify drone coverage and the required drone's altitude for providing effective relay services to an optimal number of stranded stations. Different from existing approaches, the drone could use NLoS-FSOC to communicate with the OBS and the stations in the OLAN. The system could serve at least 130% more stations, aggregate 100% more data rates, and save 116 times more energy than existing approaches.

In one embodiment, an energy- and bandwidth-efficient framework that uses NLoS-FSOC drone-assisted communications is disclosed. In another embodiment, the RESTORE algorithm could determine the drone placement and a time allocation scheme that maximizes the number of users the drone serves in the disaster-struck area. An analysis that displays the performance improvements achieved by the disclosed NLoS-FSOC framework compared to estimated energy consumption by leading drone-assisted communication schemes is provided.

In one embodiment, NLoS-FSOC is used in combination with one or more drones. The drones could carry the DRs to create OLANs and work as relays between stations and an OBS. DRs are made of passive materials and hence do not consume energy when used. The OLAN overcomes the low utilization of the FSO back-haul capacity intrinsic of RF communications, supports larger data rates and more users in the area of coverage, and consumes less power.

In one embodiment, drones could employ two diffuse reflectors, two receivers, and two transmitters. It will be understood that the number of diffuse reflectors, receivers, and transmitters in each drone could vary. The diffuse reflectors could be painted on the drone or carried on the drone. The drone could work as a relay between the stations and the optical ground base station (OBS) by becoming the communicating party to the stations, and also to the drones, and the OBS. As such, this embodiment is an active approach where the drone receives data from OBS and forwards the data to stations in the optical local area network (OLAN). In one embodiment, the diffuse reflectors could receive a signal from a station and could send the signal to stations in the vicinity, all at the same time, as an optical local area network.

In still another embodiment, no drone could be utilized to carry the diffuse reflectors. Buildings, and other structures, such as but not limited to towers, skyscrapers, rubble, landscape, and the like may be either utilized as the diffuse reflector and/or carry the diffuse reflectors. With this substitution of the drone any of the above embodiments may be utilized without the drone depending on the particular implementation and user requirements.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed systems and methods for high-speed communication for relays, reference is made to the accompanying figures, wherein:

FIG. 1 shows an exemplary network with NLoS-FSOC at back- and front-haul, in accordance with one embodiment of the present disclosure;

FIG. 2 illustrates an example of a disaster-struck area divided into sections;

FIG. 3 shows an uplink transmission from a station to the $DR_{hf}$ distance

FIG. 4 is a pictorial definition of the effective ground distance $\hat{g}$, the effective covered grid $l_z$, the effective area of coverage l and the largest ground covered $g^{-}$;

FIG. 5 shows an example of the distribution of the $B_{lz}$ for h=40 m;

FIGS. 6a-6c shows graphical depictions of the effect of h on $g^{-}$;

FIGS. 7a-7d shows graphical depictions of the effect of h on $\hat{g}$;

FIGS. 8a-8d shows graphical depictions of the comparison of the covered ground distance covered and the number of drones required to cover the whole disaster-struck area for $\hat{g}$ and $g^{-}$;

FIGS. 9a-9d illustrates graphical depictions of the comparison of $N_u$ and the aggregated $B_{DL}$ delivered ($B_{agg}$) by the drone as a function of $n_{ull}$ for $\hat{g}$ and $g^{-}$;

FIG. 11 illustrates one embodiment utilizing the principles of the present disclosure to provide a network with diffuse reflectors and without the use of drones.

DETAILED DESCRIPTION

Figures 6B, 6C:
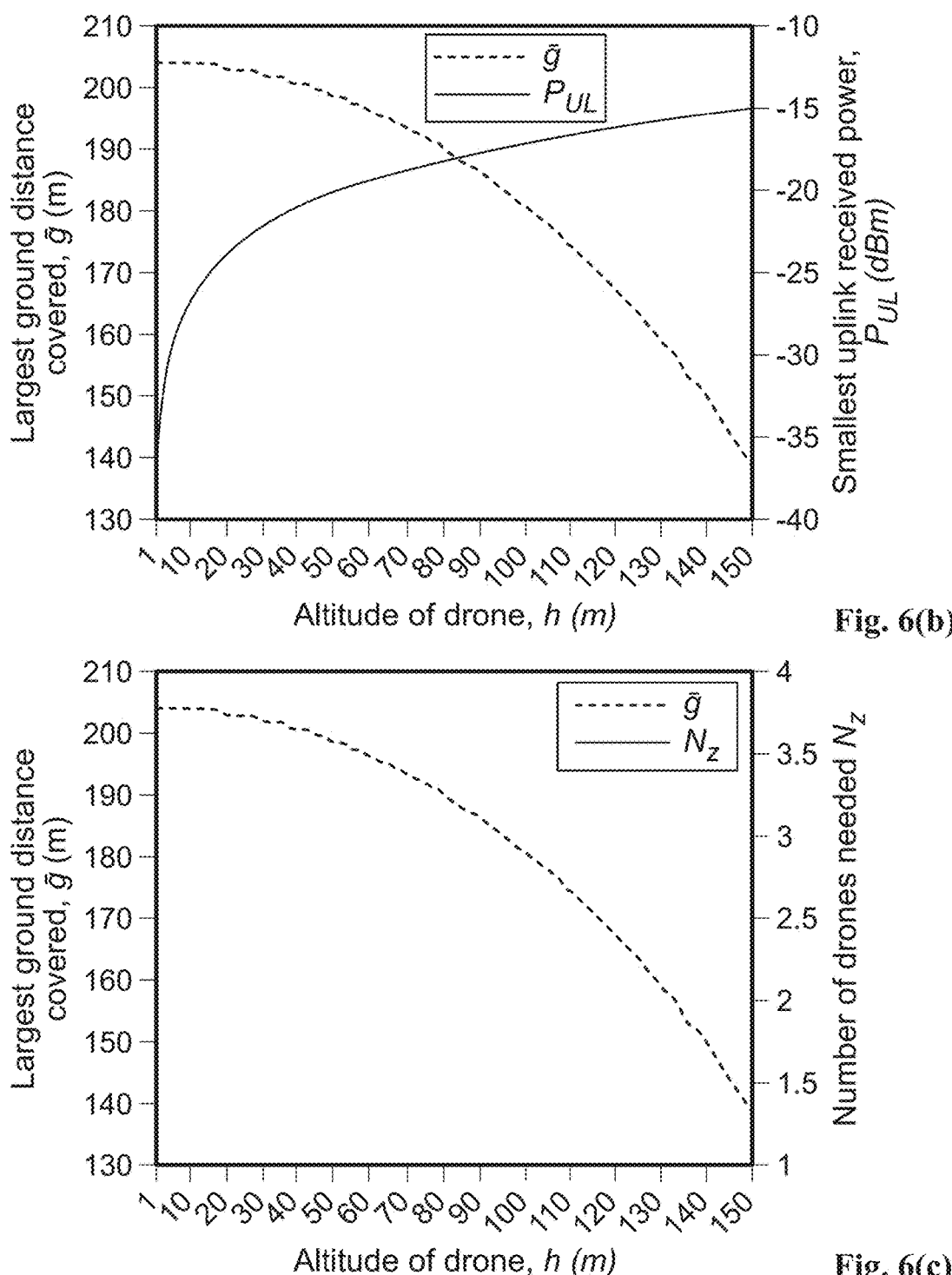

Exemplary embodiments are directed to a system and method that includes NLoS-FSOC in combination with one or more drones. Although discussed herein with respect to a drone, it should be understood that embodiments can generally be applied without the use of a drone. Common reference numbers carry similar functions to components in the various drawings and figures discuss herein. It is understood that the indefinite articles "a" or "an" carry the meaning of one or more in the present disclosure unless specifically stated otherwise.

I. Network, NLoS-FSOC Framework, and Restore Algorithm

In one embodiment, NLoS-FSOC in used in combination with one or more drones. At least two advantages exist that makes NLoS-FSOC attractive for use with drones. First, simple materials such as, but not limited to, aluminum foil, titanium dioxide paint, Teflon (polytetrafluoroethylene), and Tyvek (woven or nonwoven polyethylene) can be used as DR as they reflect 78% or more of the incident light [36], [37]. Second, the footprint of the DR and signal can be large enough to tolerate slight shifts in alignment between transmitter or receiver and the DR to keep the communications up.

Moreover, main attributes of NLoS-FSOC, not available in FSOC, are the establishment of a broadcast channel, the large line-of-sight of receivers, and ability to be out-of-sight of the transmitter. These attributes enable NLoS-FSOC to provide access to many stations and use it in drone-assisted communications. Table II summarizes a comparison of features of FSOC and NLoS-FSOC. Table III lists the notations used in analysis presented in the present disclosure.

TABLE II

COMPARISION OF FSOC AND NLOS-FSOC

| Characteristic | FSOC | NLoS-FSOC |
|---|---|---|
| Unlicensed spectrum | Yes | Yes |
| Immune to electromagnetic | Yes | Yes |
| Data rate | High | Moderate |
| Communication privacy | Strong | Moderate |
| Communication distance | Long | Short |
| Broadcast channel | No | Yes |
| Optical modulation schemes | All | Limited |
| Weather affects channel condition | Yes | Yes |
| Acquisition, pointing and tracking | Stringent | Relaxed |

TABLE III

DEFINITIONS OF NOTATIONS

| Notation | Description |
|---|---|
| h | Altitude of the drone |
| g | Ground distance between a station and the drone |
| $g^-$ | Largest ground distance covered by the drone |
| $g^\sim$ | Effective ground distance covered by the drone |
| $\theta$ | Angle of incidence |
| P | Power of the received light |
| $P_t$ | Power of the transmitted light |
| B | Data rate |
| $P_b$ | Power of the beacon light |
| $T_t$ | Duration associated to that corresponds $P_t$ |
| $T_b$ | Duration associated to that corresponds $P_b$ |
| $P_{UL}$ | Smallest uplink received power |
| $\theta_{UL}$ | Largest angle of incidence for uplink |
| $B_{UL}$ | Uplink data rate |
| $B_{DL}$ | Downlink data rate |
| $d_{tx}$ | Distance between the drone and optical transmitter |
| $d_{rx}$ | Distance between the drone and optical receiver |
| L | Area size of the disaster-struck area |
| l | Area size of a section in the disaster-struck area |

TABLE III-continued

DEFINITIONS OF NOTATIONS

| Notation | Description |
|---|---|
| $u_z$ | A station u in location in $l_z$ |
| $l_z$ | Sections l served by drone z |
| $t_u$ | Required access time of a station u |
| $t_{uz}$ | Service time allocated to station u by drone z |
| $T_z$ | Total service time drone z can allocate to stations |
| $B_u$ | Required data rate of a station u |
| $B_{lz}$ | Downlink B that can be delivered to a station |
| $N_u$ | Number of stations served by a drone |
| $B_{agg}$ | Total downlink data rate delivered by a drone |
| $N_z$ | Number of drones needed to serve L |

A. Network Setup

FIG. 1 shows one embodiment of a network that could include one or more stations 5, a drone 4, and optical base station (OBS) 1 having a diffuse reflector 2. In this embodiment, the network could be divided into two parts: a) a front-haul; the communications between a station and a drone 4, marked as solid lines in the figure, the drone 4 having a diffuse deflector 3, and b) a back-haul; the communications between the drone and the OBS, marked as dashed lines. The OBS could use one DR, $DR_{ob}$, and the drone could use two DRs, $DR_{df}$ and $DR_{db}$, one for the front-haul and the other for the back-haul, respectively.

In the front-haul, when a station transmits packets to another host or a remote destination, it is referred to an uplink (UL) transmission. When a station receives packets, it is referred to a downlink (DL) transmission. In UL, the packets are issued by the station's transmitter and projected on $DR_{df}$. Upon receiving the packets, the drone forwards them to the OBS by projecting them on the OBS'DR; $DR_{ob}$. The drone receives the UL transmission through its receiver, which is pointed at the $DR_{ob}$. The OBS receives the packets through its receiver, which is pointed to $DR_{ob}$. The receivers of the drone and OBS are placed near (i.e., 0.3 m away) to their respective DRs. In this setup, only the stations omit having a DR; they transmit and receive through $DR_{df}$.

In the DL, the OBS projects the signal on the drone's DR, $DR_{ob}$), and, in turn, the drone projects the signal on the fronthaul DR, $DR_{df}$ for the stations to receive the projected signal. In this configuration, the OBS uses one dedicated transmitter for each drone and GPS data from the drone to locate each drone. As an example of positioning and for comparison with existing approaches, a large disaster-struck area is divided into sections. The size of the section is determined by the coverage that a drone provides. In addition, the optical base station further includes a plurality of arrays for sending multiple parallel beams working at similar or different wavelengths for increasing a communication rate.

Shown in FIG. 2 is a disaster-struck area L with a square shape of size $D_0 \times 0$, as shown in FIG. 2. Let us divide L into sections l where l<L. The sections that are served by drone z, is denoted as $l_z$. FIG. 2 shows L, the serving OBS, and two drones that provide coverage over some sections in L. The area of $l_z$ is represented by radius g.

B. NLoS-FSOC System Model

According to Lambertian law [38], the incidence power, $P_0$, or the power of the transmitted light at the DR is given as:

$$P_0 - P_t e^{\gamma d_{tx}} \qquad (1)$$

7 where y is the extinction coefficient, which indicates the extent of the deterioration of $P_t$ caused by the absorption and scattering of the beam in the atmosphere, and $d_{rx}$ is the distance between the transmitter and the DR. Here, y, in dB/km, is computed using Kim's model [39]:

$$\gamma = \left(\frac{3.91}{\upsilon}\right)\left(\frac{\lambda}{550}\right)^{-q}. \tag{2}$$

where v is the visibility range of different weather conditions, l is the wavelength in nm, and q is the size distribution of the scattering particles.

$$q = \begin{cases} 1.6, & \text{high visibiliy, } (\upsilon > 50)\,\text{km} \\ 1.3. & \text{average visibility, } (6 < \upsilon \le 50)\,\text{km} \\ 016\,\upsilon + 0.34. & \text{hazy visibility, } (1 < \upsilon \le 6)\,\text{km} \\ \upsilon - 0.5. & \text{mist visibility, } (05 < \upsilon \le 1)\,\text{km} \\ 0, & \text{fog visibility, } (0.01 < \upsilon \le 0.5)\,\text{km} \end{cases} \tag{3}$$

The reflected power ($P_f$) from the surface of the DR is:

$$P_f = RP_0\cos\theta \tag{4}$$

where $\theta$ is the angle of incidence of the light beam in reference to the DR's normal and R is the reflectance of the DR. Here, a $\theta$ is considered that can optimally reflect light towards the receivers [40].

FIG. 3 illustrates an example of a UL transmission; from a station to the $DR_{df}$. Here, h is the drone's altitude in reference to the station, o is the lateral distance between the DR and the station, and $d_0$ is the travel distance from DR to the station as if they were in the same plane. Here, $\theta$ is calculated as follows:

$$\theta = \arccos\left(\frac{\overline{EA}}{\overline{EC}}\right) \tag{5}$$

or $$\theta = \arccos\left(\frac{h}{d_{tx}}\right)$$

where h>0 and $d_{rx}$>0. The line segment AE is equal to BD and the line segment ED is parallel to AB. Also, $\angle ABC=\angle EAC=90°$.

Here $d_{rx}$, and the ground distance g, measured between station and the drone, are computed as follows:

$$\overline{EC} = \left(\overline{EA}^2 + \overline{AC}^2\right)^{\frac{1}{2}} \tag{6}$$

as $$d_{tx} = \left(h^2 + g^2\right)^{\frac{1}{2}}.$$

$$\overline{AC} = \left(\overline{AB}^2 + \overline{BC}^2\right)^{\frac{1}{2}} \tag{7}$$

as $$g = \left(d_0^2 + o^2\right)^{\frac{1}{2}}.$$

8

The received power (P) at an optical receiver is proportional to the square of the distance between the DR and the ORx; that is:

$$P = \frac{R P_0 \cos\theta A_r}{\pi d_{rx}^2}. \tag{8}$$

where $A_r$ is the aperture area of the photodiode of a receiver, and $d_{rx}$ is the distance between the DR and the receiver. The achievable data rate (B) for a given P is computed as:

$$B = \frac{P\lambda}{N_p \hbar c} \tag{9}$$

where $N_p$ is the average number of photons in a single bit, ~ is Planck's constant, and c is the speed of light. $N_p$ is computed as follows:

$$N_p = \frac{\lambda\,10^{SNR/10}}{\rho\,1.24*10^{-6}} \tag{9'}$$

where SNR is the signal-to-noise ratio of the optical link and p is the responsiveness of the receiver. The NLoS-FSOC channel is significantly affected by the weather conditions indicated by y, and by $\theta$ and $d_{rx}$. P is also affected by the size of the beam captured on the surface of the DR and the pointing alignment between the transmitter and the receiver.

C. Time Division Multiplexing in the Front-Haul

In one embodiment, the drone could use time division multiple access (TDMA) to assign the data rates that stations use in the front-haul. Let $t_{uz}$ be the time allocated to station u by drone z. Also, let $T_z$ denote the total time drone z can serve the stations in section $l_z$ and let $B_z$ denote the back-haul data-rate capacity of drone z. A serving drone allocates $t_{uz}$ to station u in $l_z$. Let $u_z$ denote a station u in $l_z$, where $u \in U$. Then, $T_z$ is expressed as:

$$T_z = \sum_{\exists u_z} t_{uz}, \tag{10}$$

where $t_{uz} \ge t_u$, and $t_u$ is the access time to provide the data demand Bu of station u, which is computed as:

$$t_u = B_u/B_{l_z}. \tag{11}$$

Here, $B_L$ denotes the downlink data rate that can be delivered to the station.

D. Drone Placement and Service Allocation

The flying altitude of the drone determines g, which is computed using (7). The sought drone's altitude is one where the drone provides:

1) the largest downlink B ($B_{DL}$) and the minimum acceptable uplink B ($B_U$L) for the stations in the area of coverage or what is referred to as the largest area of coverage, represented by the radius ground distance g—, or 2) guaranteed service for every station within a given ground distance or what is referred to as the effective area of coverage, represented by the radius ground distance g^.

FIG. 4 shows the concept of g— and g^ in the area of coverage. The gray spots in the figure represent the stations that will receive service from the drone whereas the black spots are stations that will not be served.

The effective area of coverage is where all the stations in that area are guaranteed a $B_{DL}$ to satisfy $B_u$, of every station in the allotted time $T_z$ (i.e., $\Sigma t_u \leq T_z$). On the other hand, the largest area of coverage is that where all the stations in that area can be provided $B_{DL}$ but only if selected within time $T_z$. For a large station density in the area, the allocation of $T_z$ needs to be prioritized as it may serve a portion of the stations.

FIG. 4 further shows an example of the effective ground distance covered g^, the effective area of coverage, $\sqrt{}\pi g^{\wedge 2}$, and the effective covered grid, $(\sqrt{2}g^{\wedge})^2$, which is the square area within l covered by drone z.

E. Coverage of a Large Area with Multiple Drones

The estimated g provides coverage to an area smaller than L. Therefore, a number of drones, $N_z$, is required to provide coverage to the whole L. For this, a squared area is considered as the covered area, defined by the magnitude of g—. The dimensions of the covered square area by a drone as a function of g— is:

$$l_z = \sqrt{2}\,\bar{g} \times \sqrt{2}\,\bar{g} \qquad (11')$$

For the whole disaster-struck area, let $a_{uz}$ be a binary variable where $a_{uz}=1$ if there is LoS between station u and drone z, and $a_{uz}=0$ if otherwise. Also, let $a_{zb}$ be a binary variable where $a_{zb}$: $=1$ if there is LoS between drone z and the OBS, and $a_{zb}=0$ if otherwise.

$$N_z = \lceil D_0/(\sqrt{2}\,\bar{g}) \rceil \times \lceil O/\sqrt{2}\,\bar{g} \rceil. \qquad (12)$$

The optimization problem that satisfies the requested rate for the largest number of stations can be described as:

$$\arg\max_{l_z, t_{uz}, a_{uz}} \sum_{l \in L} \sum_{n \in U} a_{uz} \qquad (13)$$

s.t $$C1: \sum a_{uz} > 0. \forall\, u_z \in$$

$$C2: a_{zb} > 0$$

$$C3: \sum_{u,\in l_z} a_{uz} \leq 1, \forall\, z \in 2$$

$$C4: h_{min} \leq h \leq h_{max}$$

$$C5: h_u \leq h$$

$$C6: B_u \leq B_{l_z}$$

$$C7: B_{l_z} \leq B_z$$

$$C8: t_u \leq t_{uz}$$

$$C9: \sum t_{uz} \leq T_z$$

$$C10: \sum l_u * B_{lz} \leq B_z$$

Constraint C1 implies at least one station has LoS to the drone. Constraint C2 ensures LoS between the drone and the OBS. Constraint C3 ensures that a station in the disaster-struck area receives service from a single drone. Constraint C4 defines the altitude range at which the drone flies. Constraint C5 ensures the station is within coverage provided by the drone. Constraint C6 ensures that the required data rate of a station does not exceed the data rate that the drone can provide at that location. Constraint C7 ensures the maximum data rate at a given location does not exceed the back-haul capacity of the drone. Constraint C8 guarantees that the access time allocated to a station is large enough to provide the required data rate. Constraint C9 ensures that the cumulative service time allocated to the stations does not exceed the total service time of the drone, and constraint C10 ensures that the total data rate delivered by the drone to the stations does not exceed the back-haul capacity.

F. RESTORE Algorithm

A drone placement and access time allocation for disaster rescue (RESTORE) may be utilized with the present disclosure, with or without use of a drone. The three-dimension cell deployment of a drone base station is NP-hard because it is a multi-dimensional knapsack problem [41], [42].

Therefore, RESTORE is disclosed, which is a heuristic algorithm that determines the flight altitude of a drone (h*) so that it provides LoS to the largest number of stations, and allocates access time to stations so that the drone serves the largest number of them. Algorithm 1 details the steps of RESTORE.

Algorithm (1) RESTORE Implementation is shown in the exemplary steps:

1: Divide L into sections of dimensions of l.
2: Place the drone in the center of each section.
3: Fly the drone from $h_{min}$ to $h_{max}$ to find h*.
4: Place drone at h*.
5: Allocate $t_{uz}$ starting from the smallest $t_u$.
6: Decrease $T_z$ by $t_{uz}$ for each allocation until $T_z$ is used up.

RESTORE first performs station discovery to detect the number of stations with LoS to the drone. The scheme adopts the discovery mechanism used in [43]-[45], where the number of stations is detected by allowing the stations to transmit a request packet for a period of time.

II. Evaluation and Simulation Results

The largest and effective area of coverage is evaluated as a function of the flight altitude of a drone, and also the performance is compared to leading approaches. The achievable data rate is determined by the received power, the sensitivity of the receiver, and the used modulation scheme. As a receiver, a Mercury Cadmium Telluride (HgCdTe) avalanche photodiode (APD) with high sensitivity to wavelengths at 1550 nm and a receiver responsiveness of 0.8 A/W, and an aperture of the receiving lens of $9.5 \times 10^{-3}$ m$^2$ may be considered.

The modulation scheme considered for an optical link with an SNR of 15.56 dB that requires at least 57 bits per photon to achieve a maximum bit error rate of $10^{-9}$ is On-Off-keying with Non-Return-to-Zero (OOKNRZ). The drone projects a light beam with $\theta=60°$, a transmission power of 100 mW, and a beacon light at 10 mW. The transmission power used by a station, drone's back-haul, and the OBS are 5, 50, and 50 mW, respectively.

The achievable data rate is presented in the area of coverage (Section A), the largest covered area using NLoS-FSOC (Section B), the effective covered area using NLoS-FSOC (Section C), a comparison of RESTORE to existing allocation schemes for drones that use RF (Section D), and a comparison of the energy consumption of RESTORE with that of the considered schemes (Section E).

A. Range and Achievable Rates at the Front-Haul

FIG. 5 shows the distribution of $B_I$ to a section as a function of the radius (g) for h=40 n, as an example. As shown in the figure P decreases, and so does $B_I$, as g increases. Considering the coverage shape, the drone is placed at the center of the O=200 m and $D_0$=200 m area. The figure shows the different achievable data rates, with 0.5 Gbps being the smallest on the boundaries of the square area.

B. The Largest Area of Coverage

FIGS. 6a-6c show numerical evaluations of the largest ground (covered) distance, the largest uplink angle of incidence $\theta_{UL}$, the smallest uplink received power $P_{UL}$, and $N_z$ for providing coverage of the whole area L, all as a function of the altitude of the drone.

FIG. 6a shows the largest ground distance at which the drone can provide $B_{DL}$=0.5 Gbps, as an example. The graph shows that g decreases as h increases. The increase in h also increases $d_{rx}$, which in turn decreases P and the corresponding $B_{DL}$. Therefore, to sustain $B_{DL}$ in the covered area when h increases, g— decreases for the covered area. The graph also shows that $\theta_{UL}$ (5) decreases as h increases.

This result is because an increase in h produces a small increase in da (6), which in turn increases (h/$d_{rx}$) and that results in a decrease in $\theta_{UL}$ (5). Here, P≥−54.4 dBm achieves $B_{UL}$ of 0.5 Gbps for the considered receiver in the present disclosure.

FIG. 6b shows $P_{UL}$ (8), provided at the boundary of the area of coverage, as a function of h computed using $\theta_{UL}$ in FIG. 6a. The figure shows that $P_{UL}$ is larger than −54.4 dBm when h≤166 m.

FIG. 6c shows that 1 drone is needed to cover the disaster-struck area for h between 1 and 146 m, and 4 drones for h>146 m. This number of drones is expected as the drones are placed in a bi-dimensional grid so that the number of drones increases exponentially. For example, $N_z$ increases from 1 to 4 for h≥147 m, because the largest $\sqrt{2}$g—<200 m.

C. The Effective Area of Coverage

Figures 7A, 7B:
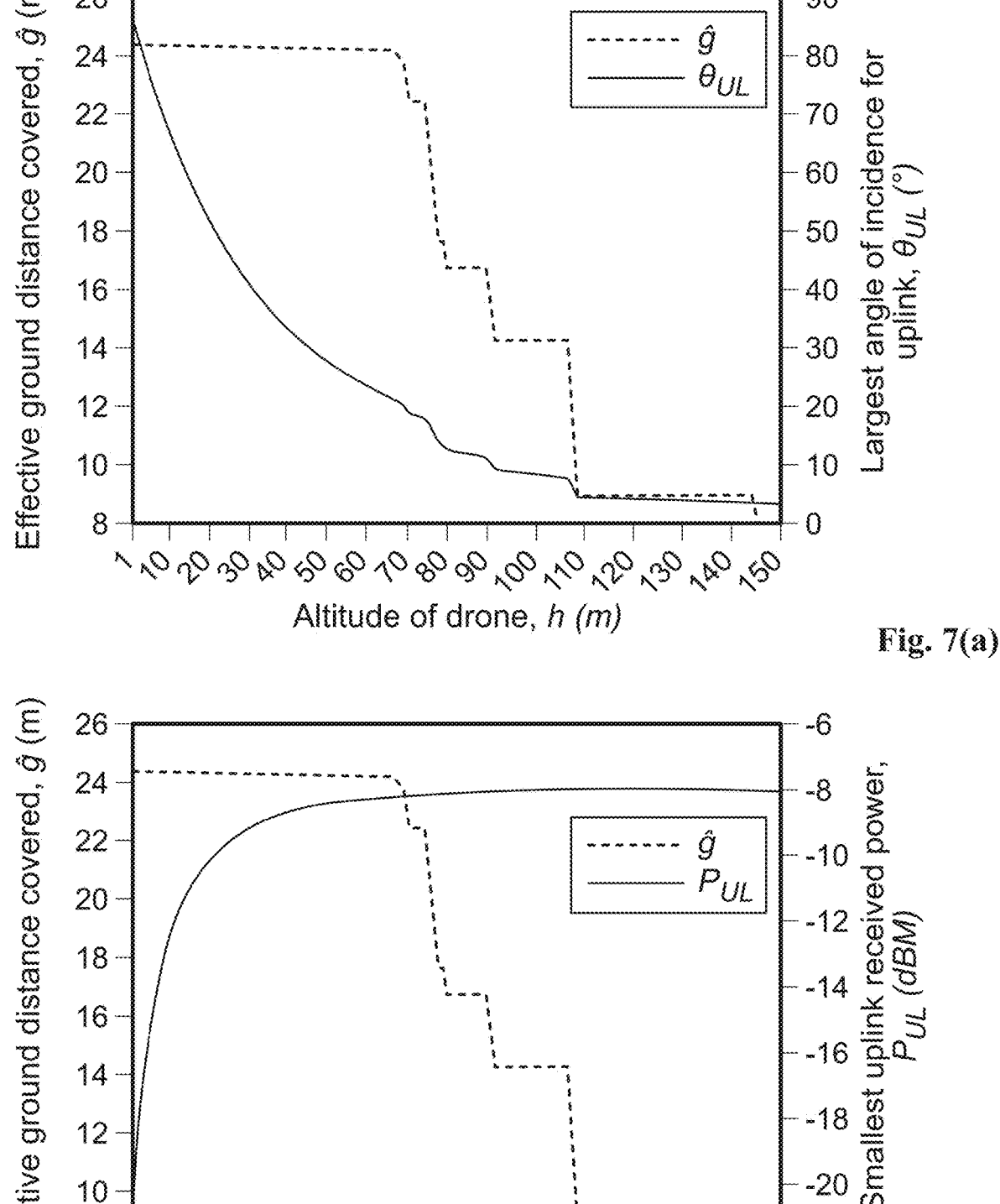

In FIG. 4, consider the area of L shown in FIG. 4 where $B_u$=50 Mbps for each station, and $B_{UL}$=50 Mbps. Furthermore, let us consider in size of a section in this example to be l=20×20 m², and an average of 20 stations per section, or station density $n_{all}$=20. FIG. 7a shows that both ĝ and the corresponding $\theta_{UL}$ decrease as h increases. The value of ĝ decreases because the distance $d_{rx}$ increases and that decreases the downlink P and $B_I$.

The decrease in B, increases $t_{uz}$. Therefore, $T_z$ is rapidly exhausted as $t_{uz}$ increases. $\theta_{UL}$ decreases as h increases. The discrete changes on $\theta_{UL}$ in the figure are the product of using the concept of effective area, which in this case is a square-shaped area formed by a grid-like distribution of stations.

FIG. 7b shows that $P_{UL}$ increases as h increases because $\theta_{UL}$ of the stations decreases. In turn, that increases the uplink $P_f$ at $DR_{df}$ and the uplink P received by the drone. $P_{UL}$ is at most −22 dBm, and that implies that the smallest uplink P can achieve $B_{UL}$.

FIG. 7c shows the number of stations served (Na) as a function of h. As shown in this figure, the number of stations served decreases as ĝ decreases. The decrease in N occurs because $B_{DL}$, decreases as h increases, and in turn, $t_{uz}$ (11) allocated to the stations in the area of coverage is increased. The increase in $t_{uz}$ depletes $T_z$ significantly. The result is a decrease in the number of stations that can be served within $T_z$. FIG. 7d illustrates the relationship between the altitude of the drone and effective ground distance covered.

Considering the size and shape of the effective area depends on the distribution of stations and the use of TDMA, the number of drones needed to cover L is estimated. FIG. 7d shows that $N_z$ increases as h increases. As h increases, the size of the area of coverage decreases, and the number of drones needed to provide coverage to the whole disaster-struck area increases to account for the difference in ĝ because of the decrease of the area of coverage. More noticeable, is that a small decrease in ĝ significantly increases the required $N_z$, as shown in the figure. For example, ĝ=24.3 m requires $N_z$=36 whereas ĝ=24 in requires $N_z$=64 to serve the disaster-struck area.

D. Comparative Analysis

The exemplary system (RESTORE) of the present disclosure is compared with existing drone-assisted emergency communications schemes in terms of the total number of drones needed to serve the disaster-struck area, the total number of served stations, the aggregated data rate, and the energy consumption of a drone during downlink transmissions. The existing schemes are the traffic load (TLA) [27], pathloss awareness (PLA) [28], and profit maximization (PMA) schemes [3]. These three schemes use RF communications in the front-haul and FSOC in the back-haul. Different from those schemes, RESTORE uses NLoS-FSOC links at both the front- and back-haul. The present inventors considered the disaster-struck area in FIG. 2 for the compared schemes where L=200×200 m² with l=20×20 m² and a serving drone hovering at h=40 m. $B_u$ is randomly generated between 10-25 Mbps for $n_{all}$={20, 25, 30, 35, 40} and $T_z$=1 s for RESTORE.

In RF communications, $B_u$ is converted into the corresponding bandwidth (BW), which the drone allocates to serve the station in 1 s. The demanded BW of station u, $BW_u$, is estimated from the expected SNR for the communication link between the drone and a station in the area of coverage, that is explained by the following equation (14):

$$BW_u = B_u / \log_2(1 + SNR). \tag{14}$$

The below Table IV shows the parameters used in the compared schemes for front-haul RF communications. The present inventors used the model in [28] to compute the pathloss for the RF schemes. The parameters for FSOC used at the back-haul by the compared schemes are similar to those of NLoS-FSOC.

TABLE IV

| Parameters Used for RF Stimulation | |
|---|---|
| RF Parameter | Values |
| The optimal altitude of the drone | 40 m |
| Carrier frequency | 2 GHz |
| S-curve environment index (b) | 9.61 |
| S-curve environment index (a) | 0.16 |
| Average excessive pathloss in LoS | 1 dB |
| Average excessive pathloss in NLoS | 20 dB |
| Noise power spectral density | −120 dBm |
| DBS downlink transmission power | 20 dBm |
| The available bandwidth for each drone | 100 MHz |

A brief description of allocation policies used by these works is as follows: TLA allocates the available bandwidth to the stations that experience the smallest pathloss and demand the largest data rates, first. PLA allocates bandwidth in the order of the stations that are closest to the drone, demand the largest data rates, and can be satisfied with the least bandwidth. PMA allocates bandwidth in the order of the stations that demand the largest data rates and can be satisfied with the least bandwidth.

Figure 8A:
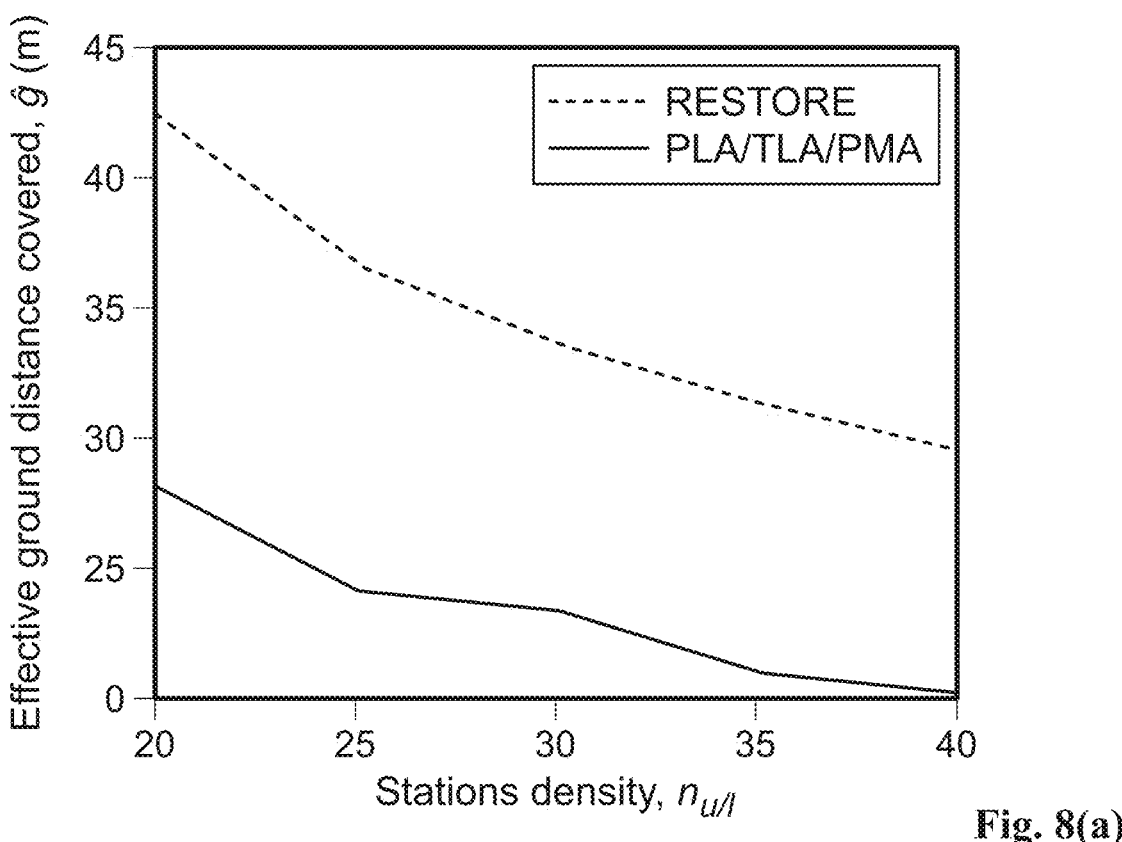
Figure 8B:
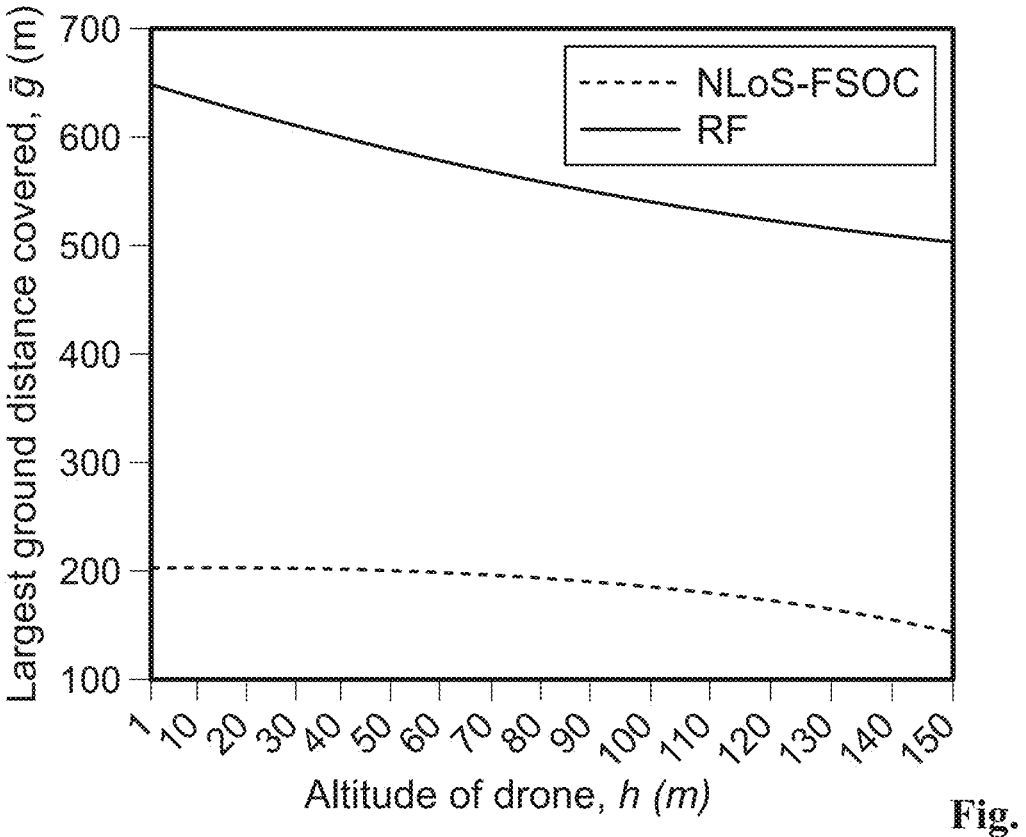

FIG. 8$a$ and FIG. 8$e$ show ĝ and $N_2$ as a function of $n_{ull}$. FIG. 8$b$ and FIG. 8$d$ show g and $N_z$ as a function of h. The comparisons apply to the base technologies of the compared schemes; NLoS-FSOC and RF. These results show that the compared RF schemes achieve similar results because the schemes use the same RF technology on the front haul.

FIG. 8$a$ shows that ĝ decreases for both RESTORE and the RF schemes as $n_{ull}$ increases. The size of the area of coverage decreases because the allotted time for TDMA used by the drone is exhausted faster as the station density increases. However, the FSOC back-haul capacity is not fully utilized because of the limited BW or limited $T_z$ at the front-haul. Therefore, ĝ decreases as $n_{ull}$ increases. The figure also shows that RESTORE outperforms RF schemes because the high data rates in NLoS-FSOC require a smaller $t_{uz}$. Therefore, by using an appropriate $T_z$, NLoS-FSOC serves more stations than RF. On the other hand, the low data rates of the RF schemes require larger BW. This implies BW serves fewer stations for the RF schemes.

On the other hand, g— depends on the ground distance from the drone at which $B_{DL}=B_{UL}$. Therefore, the present inventors compare g— for the base technologies, NLoS-FSOC and RF, as a function of h for $B_{DL}=B_{UL}=0.5$ Gbps.

As shown in FIG. 8$b$, g— of RF is larger than that of NLoS-FSOC because the receivers in RF systems have a low spectral noise density so that the SNR for a large pathloss is large enough to achieve 0.5 Gbps for the available BW.

FIG. 8$c$ and FIG. 8$d$ show the required $N_z$ to cover the disaster-struck area for ĝ and g—, respectively. As expected, $N_z$ increases when g— decreases. Here, g— requires a smaller number of drones because not all stations are served by the drone even though any one of the stations can potentially be served. Because the smallest g— is 503 in for the drone using RF, a single RF drone is able to provide coverage for the disaster-struck area according to (12).

Figure 9A:
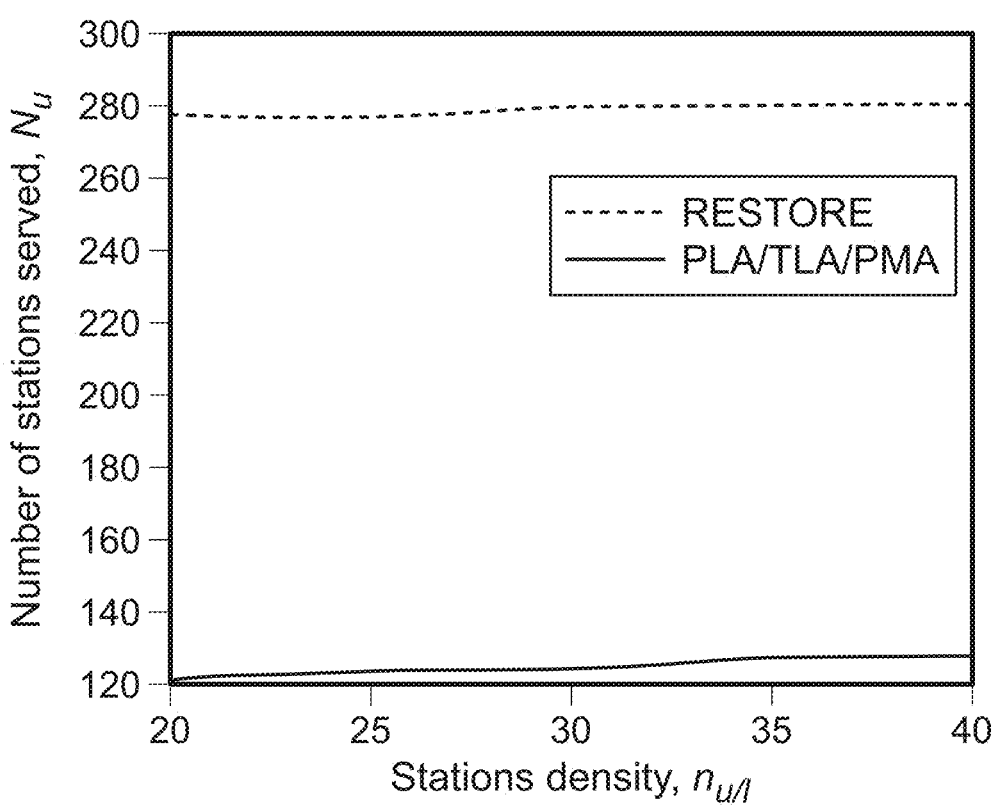
Figure 9B:
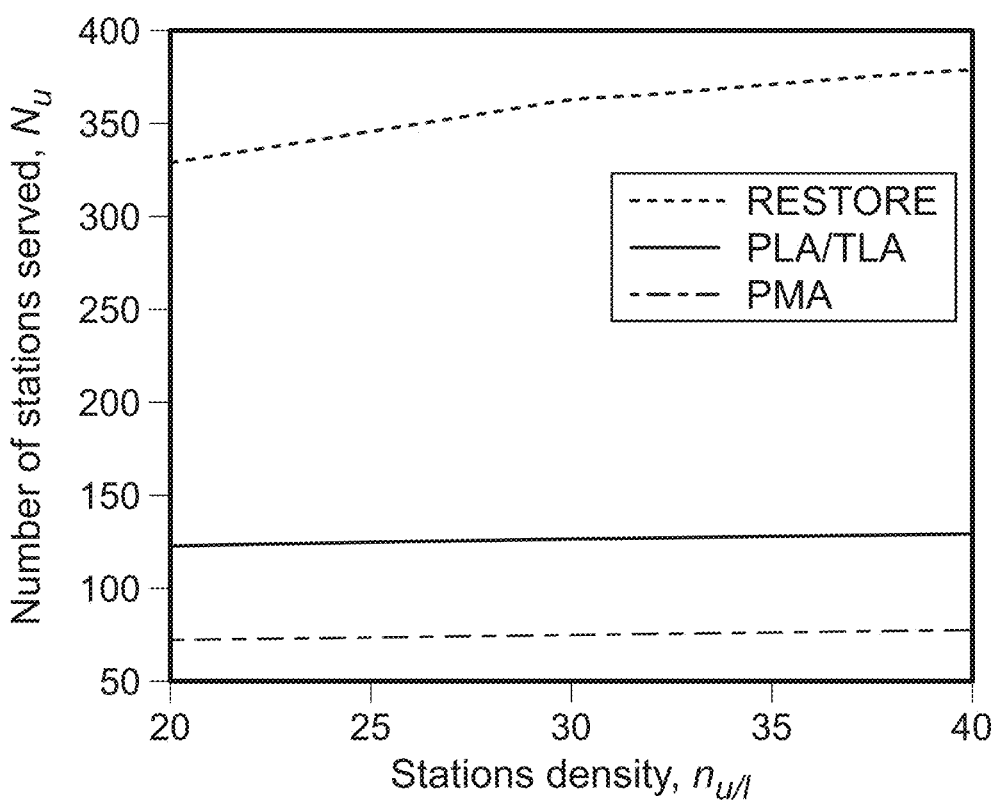

FIGS. 9$a$-9$d$ show a comparison of $N_u$ and the aggregated $B_{DL}$ delivered ($B_{agg}$) by the drone as a function of $n_{ull}$. FIG. 9$a$ and FIG. 9$b$ compare the number of stations served in g— and g— for the considered schemes, respectively. Both RESTORE and the RF allocation schemes show a small increase in $N_u$ and $B_{agg}$ as $n_{ull}$ increases. This increase is generated by the increase in the number of stations that require smaller $B_u$ on a given ground distance as $n_{ull}$ increases. Therefore, the drone serves more stations as $n_{ull}$ increases. The number of stations served in ĝ may differ from those in g because service in ĝ requires every data rate demand of the stations near the drone to be satisfied. Unlike service within ĝ, the allocation schemes choose which station's data demand to satisfy. Therefore, the drone serves the stations in g— according to the serving policy followed by the scheme.

As shown in FIG. 9$b$, the number of served stations varies for the schemes except for TLA and PLA, whose performance difference is small. PMA achieves the lowest performance because the higher data rate first condition requires a large $BW_u$ for the stations that are far from the drone. RESTORE outperforms the RF allocation schemes on the number of stations served because of the large data rate NLoS-FSOC achieves when compared to that achieved in RF. As a result, $t_{uz}$, which is required for $B_u$ is much smaller in NLoS-FSOC than $BW_u$ for the RF schemes. Therefore, $T_z$ is used to serve more stations.

FIG. 9$c$ and FIG. 9$d$ show $B_{agg}$ for ĝ and g— for FIG. 9$a$ and FIG. 9$b$, respectively. As shown in the FIG. 9$c$ and FIG.

9$d$, $B_{agg}$ increases as the number of served stations by the allocation scheme also increases. RESTORE servers more stations than the RF allocation schemes in both $N_u$ and $B_{agg}$ by more than 100%.

E. Energy Consumption

A significant advantage of RESTORE and/or the present disclosure over the existing schemes is its energy consumption. In this estimation, the present inventors consider the energy consumed for transmission is significantly larger than for reception, so the transmission energy of each scheme is compared.

The amount of energy consumed by a flying drone at time E, depends on the amount of energy consumed for the transmission and reception of data and for the traveling to and hovering over the designated location, or:

$$E_t = P_a T_a + P_h T_h + P_b T_b + P_r T_r + P_{tx} T_t \qquad (15)$$

In equation (15), the following applies where $P_a$ and $T_a$ are the power used to travel to the deployed location and the travel time, respectively, $P_h$ and $T_h$ are the power required to hover over the designated location and the hovering time, respectively, and $P_b$ and $T_h$ are the power used in the transmission of the beacon signal and the time it is transmitted, respectively.

$P_{tx}$ is the power used for transmissions, and $P_r$ is the power used in receiving a transmission. $T_t$ and $T_r$ are the time in which $P_{tx}$ and $P_r$ are spent, respectively.

The energy consumed by the drone in the back-haul is equal for all the compared schemes because the parameters used in the FSOC at the back-haul link are the same as those in NLoS-FSOC. Therefore, the difference in the consumed energy is found in the front-haul transmissions the drone makes.

The energy consumption of the drone for NLoS-FSOC and RF downlink transmissions to stations are given by (16) and (17), respectively.

Here, $E_{NLoS}$ and $E_{RF}$ are the energy consumption on the front-haul DL for NLoS-FSOC and RF transmission, respectively, where $N_u$ for ĝ and g— are served concurrently by a drone using RF transmission. Here, $T_h=T_t=1$ for the schemes.

The following equations apply to the above:

Equations (16) and (17) calculate the Energy as it related to a NLoS system and a RF system, respectively:

$$E_{NLoS} = P_{tx}^{NLoS} T_t + P_b^{NLoS} T_b \qquad (16)$$

$$E_{RF} = \sum_{u=1}^{N_a} P_{t,x}^{RF} T_i \qquad (17)$$

To simplify the computation without losing generality, the present inventors consider the energy consumed by the transmitter of the drone to be equal to its transmitting power in the schemes. $P_{tx}^{RF}$ is the transmission power of the RF schemes, and $P_{tx}^{NLoS}$ and $P_b^{NLoS}$ are the NLoS-FSOC transmit power for the data and the beacon signal, respectively.

Figures 10A, 10B:
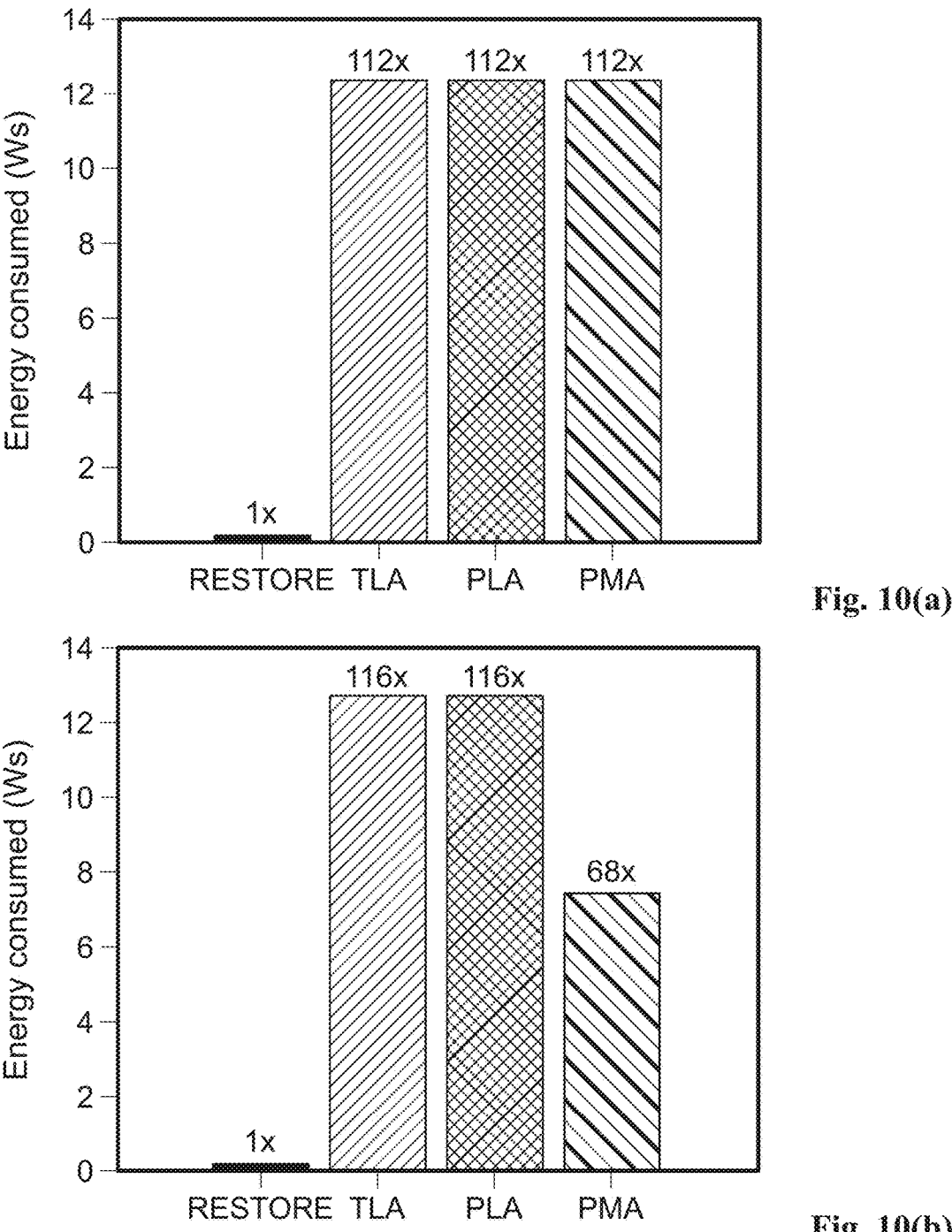
FIGS. 10a-10b show the total energy consumed by the downlink transmissions of a drone in 1 second with $n_{ull}$=20 for $\hat{g}$ and $g^{-}$, respectively.

FIG. 10$a$ and FIG. 10$b$ show the total energy consumed by the downlink transmissions of a drone in 1 second with $n_{ull}=20$ for g— and g—, respectively. As expected, the RF schemes consume more energy than RESTORE because they use multiple transmitters as each transmitter serves a station that has been allocated bandwidth by the drone.

RESTORE of the present disclosure on the other hand consumes a fixed amount of energy because the drone serves many stations with a single transmitter during the downlink transmission by using TDMA and the large data rates enabled by NLoS-FSOC. With TDMA, the drone in RESTORE uses a single transmitter to continuously transmit for a duration equal to T, but the transmission is segmented into a number of service times for the stations, where each segment delivers data to a station that is allocated $t_{uz}$. The energy savings ratio ($E_\delta$) can be expressed as a fraction of $E_{RF}$ to $E_{NLoS\text{-}FSoC}$, that is:

$$E_\delta = \frac{E_{RF}}{E_{NLoS}} \qquad (18)$$

Specifically, RESTORE consumes a fraction of two orders of magnitude less energy than the other schemes (i.e., $E_\delta$>100 times). This significant energy saving is the product of the adoption of NLoS-FSOC for the front-haul links as the high bandwidth of the channel permits the use of TDMA despite the limitations on the drone altitude of NLOS-FSOC. While RESTORE and the systems and methods disclosed herein serve more users than reported RF-based, it also provides a method that differentiates requests for emergency and security services from other services during its operation in the aftermath of a disaster. For purposes of this disclosure high bandwidth means a communication speed of at least 25 Mbps, or a speed of 100 Mbps or higher.

This classification may use uplink requests to carry information that identifies the type of service. The implementation of such additional services would also require development of bandwidth and service allocation schemes that the present disclosure provides.

Additionally, some services require classification of the traffic type a station transmits and receives. In rescue operations, some services may require the transmission of voice, video, and data packets [46]-[50]. These traffic types have their own latency requirement and, therefore, require the development of allocation schemes to allow both uplink requests and downlink responses to comply with such requirements.

Adverting to FIG. 11 shown is an exemplary network using the principles of the present disclosure and without the use of drones. Illustrated is an OBS 1 with a DR 2. Depending on the implementation buildings 8 may or may not be in a disaster zone. In addition buildings or obstacles 8 may also represent mountains hills or other natural or man-made structures that block line of sight communication or RF communications in general. Again, a non-direct line-of-sight free-space optical communications (NLoS-FSOC) enables to transmit and receive wireless signals at the frequency of light (infrared or visible, or other) for communications using a diffuse reflector. OBS 1 further may include a DR 2 that transmits a laser frequency to one or more stations 6 having DR 7 that may receive and transmit signals via NLoS-FSOC on the other side of buildings or obstacles 8. Diffuse reflectors again may be an inner material of a structure. This material includes, but is not limited to, Teflon(tetrafluoroethylene), other plastics, wall paint, paper, or many other materials. Therefore, DRs are readily available in cities, buildings, and even in natural environment such as rocks or man-made environments such as concrete. NLoS-FSOC may include the use of modulation techniques and multiple antennas to increase the transmission of symbols that may produce communications at multi-gigabit per second (i.e., tens of gigabit per second). NLoS can be use multiple parallel beams working at the same wavelength to also increase the communication rates.

Depending on the implementation a projected beam of NLoS-FSOC may be observed by using zoom lenses for a receiving station 6 far away. The station may need these special lenses to gain improved line of sight and being able to receive very small signals. In this case, the communication range can be increased.

Figure 12:
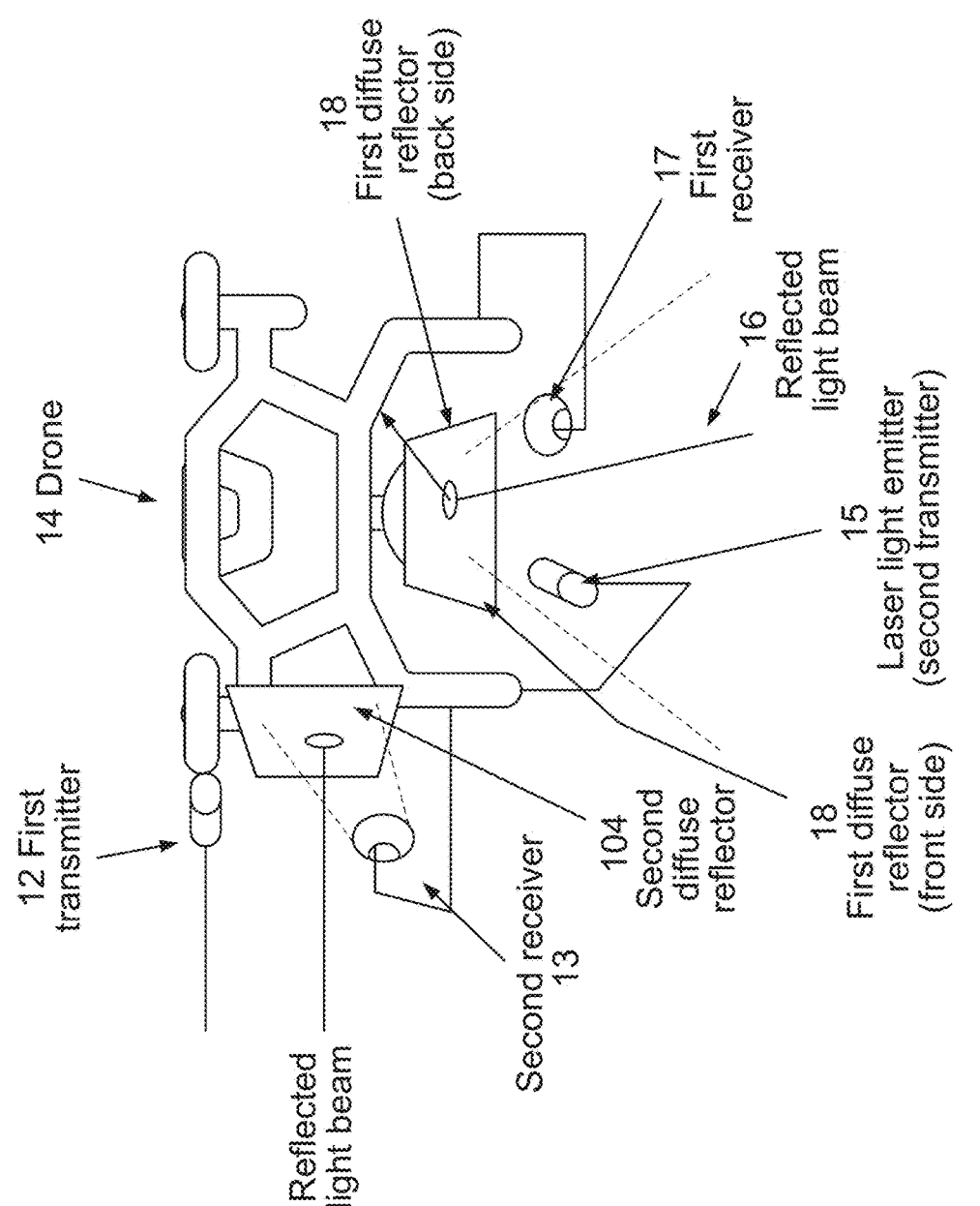
FIG. 12 illustrates one embodiment utilizing the principles of the present disclosure using a drone with two diffuse reflectors.

FIG. 12 illustrates another embodiment of the present disclosure utilizing more than one diffuse reflector. Shown is drone 14 having a first diffuse reflector 18 and a second diffuse reflector 104. The diffuse reflectors may also have a front side and a back side as shown for first diffuse reflector 18. Depending on the embodiment the drone 14 may have two diffuse reflectors, or more than two reflectors, or only the first diffuse reflector, or only the second diffuse reflector. The advantage of having more than one diffuse reflector is the drone's increased ability to receive a transmission, for example, from reflected light beam 16. In addition another advantage of having more than one diffuse reflector is receiving more than one different reflected light beams or transmissions. For example as shown in FIG. 12 at second diffuse reflector 104 the reflected light beam may be a different reflected light beam than reflected light beam 16 for receiving multiple and different reflected light beams, or the reflected light beam at second diffuse reflector 104 may be the same reflected light beam 16 for increased receivability of a single reflected light beam signal.

Similar to the drone 4 in FIG. 1, drone 14 depending on the implementation may have similar network capabilities and work in the network shown in FIG. 1. As previously described, FIG. 1 and FIG. 12 may have the network that could include one or more stations 5, one or more drones, and optical base station (OBS) 1 having one or more diffuse reflectors 2. In this embodiment, the network could be divided into two parts: a) a front-haul; the communications between a station and one or more drones, marked as solid lines in the FIG. 1, the drone having one or more diffuse deflectors, and b) a back-haul; the communications between the drone and the OBS, marked as dashed lines. The OBS could use one DR, $DR_{ob}$, and the drone could use two DRs, $DR_{df}$ and $DR_{db}$, one for the front-haul and the other for the back-haul, respectively.

Drone 14 again may have a first diffuse reflector 18 and a second diffuse reflector 104. Again, depending on the implementation there may be more than two diffuse reflectors on the drone, or just one diffuse reflector on the drone. In addition, if multiple drones are utilized, there may be some drones with one, two, or more than two diffuse reflectors. In this scenario the drone may have the same number of diffuse reflectors, or different number of diffuse reflectors than the other drones. Multiple drones are shown in FIG. 1 for example. The scenario of using variable amounts or same amounts of diffuse reflectors in each drone may also be used with the transmitter and laser light emitter and receiver depending on the need.

Drone 14 may also have a first transmitter 12 and a second transmitter or laser light emitter 15. The functions of these transmitters have the same functions as transmitters previously described herein. In addition The drone 14 may also have a first receiver 17 and a second receiver 13. Again, functions of these receivers have the same functions as receivers previously described herein. Depending on the implementations the number of transmitters and receivers on the drone may be one, two, or more than two, and if multiple drones are used the drones may have the same number or different numbers of transmitters and receivers.

Depending on the embodiment drone 4 and/or drone 14 may be utilized as a relay and the drone used as an active diffuse reflector wherein the drone projects a light beam to one of its own diffuse reflectors for a receiving station to receive a transmission.

While exemplary embodiments have been described herein, it is expressly noted that these embodiments should not be construed as limiting, but rather that additions and modifications to what is expressly described herein also are included within the scope of the invention.

Moreover, it is to be understood that the features of the various embodiments described herein are not mutually exclusive and can exist in various combinations and permutations, even if such combinations or permutations are not made express herein, without departing from the spirit and scope of the invention.

REFERENCES

[1] M. Alzenad, A. El-Keyi, and H. Yanikomeroglu, "3-d placement of an unmanned aerial vehicle base station for maximum coverage of users with different qos requirements," *IEEE Wireless Communications Letters*, vol. 7, no. 1, pp. 38-41, 2017.

[2] Z. Wang, L. Duan, and R. Zhang, "Adaptive deployment for UAV-aided communication networks," *IEEE transactions on wireless communications*, vol. 18, no. 9, pp. 4531-4543, 2019.

[3] C. T. Cicek, H. Gultekin, B. Tavli, and H. Yanikomeroglu, "Backhaul-Aware Optimization of UAV Base Station Location and Bandwidth Allocation for Profit Maximization," *IEEE Access*, vol. 8, pp. 154573-154588, 2020.

[4] Y. Zeng, R. Zhang, and T. J. Lim, "Wireless communications with unmanned aerial vehicles: Opportunities and challenges," *IEEE Communications Magazine*, vol. 54, no. 5, pp. 36-42, 2016.

[5] G. Tuna, B. Nefzi, and G. Conte, "Unmanned aerial vehicle-aided communications system for disaster recovery," *Journal of Network and Computer Applications*, vol. 41, pp. 27-36, 2014.

[6] M. Erdelj, E. Natalizio, K. R. Chowdhury, and I. F. Akyildiz, "Help from the sky: Leveraging UAVs for disaster management," *IEEE Pervasive Computing*, vol. 16, no. 1, pp. 24-32, 2017.

[7] D. Wu, X. Sun, and N. Ansari, "An FSO-based drone assisted mobile access network for emergency communications," *IEEE Transactions on Network Science and Engineering*, vol. 7, no. 3, pp. 1597-1606, 2019.

[8] P. Boccardo, F. Chiabrando, F. Dutto, F. G. Tonolo, and A. Lingua, "UAV deployment exercise for mapping purposes: Evaluation of emergency response applications," *Sensors*, vol. 15, no. 7,pp. 15717-15737, 2015.

[9] Z. Qin, C. Dong, A. Li, H. Dai, Q. Wu, and A. Xu, "Trajectory planning for reconnaissance mission based on fair-energy uavs cooperation," *IEEE Access*, vol. 7, pp. 91120-91133, 2019.

[10]. Maza, K. Kondak, M. Bernard, and A. Ollero, "Multi-UAV cooperation and control for load transportation and deployment," in *Selected papers from the 2nd International Symposium on UAVs, Reno, Nevada, USA Jun. 8-10, 2009*. Springer, 2009, pp. 417-449.

[11] L. Y. Sorensen, L. T. Jacobsen, and J. P. Hansen, "Low cost and flexible UAV deployment of sensors," *Sensors*, vol. 17, no. 1, p. 154, 2017.

[12] G. Yun and M. Kavehrad, "Indoor infrared wireless communications using spot diffusing and fly-eye receivers," *Canadian Journal of Electrical and Computer Engineering*, vol. 18, no. 4, pp. 151-157, 1993.

[13] O. Bouchet, H. Sizun, C. Boisrobert, F. Fornel, and P.-N. Favennec, "Free-Space Optics: Propagation and Communication," *Free-Space Optics: Propagation and Communication*, 01 2010.

[14] D. Wu, Z. Ghassemlooy, H. Le Minh, S. Rajbhandari, M.-A. Khalighi, and X. Tang, "Optimisation of Lambertian order for indoor non-directed optical wireless communication," in *2012 1st IEEE International Conference on Communications in China Workshops (ICCC)*. IEEE, 2012, pp. 43-48.

[15] Y. Kaymak, S. Fathi-Kazerooni, and R. Rojas-Cessa, "Indirect Diffused Light Free-Space Optical Communications for Vehicular Networks," *IEEE Communications Letters*, vol. 23, no. 5, pp. 814-817, 2019.

[16] Y. Ran, "Considerations and suggestions on improvement of communication network disaster countermeasures after the wenchuan earthquake," *IEEE Communications Magazine*, vol. 49, no. 1, pp. 44-47, 2011.

[17] M. Inoue, Y. Owada, K. Hamaguti, and R. Miura, "Nerve net: A regional-area network for resilient local information sharing and communications," in *2014 Second International Symposium on Computing and Networking*. IEEE, 2014, pp. 3-6.

[18] F. Patricelli, J. E. Beakley, A. Carnevale, M. Tarabochia, and D. K. Von Lubitz, "Disaster management and mitigation: the telecommunications infrastructure," *Disasters*, vol. 33, no. 1, pp. 23-37, 2009.

[19] C. B. Nelson, B. D. Steckler, and J. A. Stamberger, "The evolution of hastily formed networks for disaster response: technologies, case studies, and future trends," in *2011 IEEE Global humanitarian technology conference*. IEEE, 2011, pp. 467-475.

[20] U. Ashraf, A. Khwaja, J. Qadir, S. Avallone, and C. Yuen, "WiMesh: leveraging mesh networking for disaster communication in resource constrained settings," *Wireless Networks*, vol. 27, no. 4, pp. 2785-2812, 2021.

[21] S. S. Anjum, R. M. Noor, and M. H. Anisi, "Review on MANET based communication for search and rescue operations," *Wireless personal communications*, vol. 94, no. 1, pp. 31-52, 2017.

[22] S. Ghafoor, P. D. Sutton, C. J. Sreenan, and K. N. Brown, "Cognitive radio for disaster response networks: survey, potential, and challenges," *IEEE Wireless Communications*, vol. 21, no. 5, pp. 70-80, 2014.

[23] D. Wu, X. Sun, and a. N. Ansari, "An FSO-Based Drone Assisted Mobile Access Network for Emergency Communications," *IEEE Transactions on Network Science and Engineering*, vol. 7, no. 3, pp. 1597-1606, 2020.

[24] X. Li, "Deployment of drone base stations for cellular communication without apriori user distribution information," in *2018 37th Chinese Control Conference (CCC)*. IEEE, 2018, pp. 7274-7281.

[25] G. S. L. K. Chand, M. Lee, S. Y. Shin et al., "Drone based wireless mesh network for disaster/military environment," *Journal of Computer and Communications*, vol. 6, no. 04, p. 44, 2018.

[26] A. Gholami, U. A. Fiaz, and J. S. Baras, "Drone-assisted communications for remote areas and disaster relief," *arXiv preprint arXiv:1909.02150*, 2019.

[27] N. N. Bhuiyan, R. T. Ratri, I. Anjum, and M. A. Razzaque, "Traffic-load aware spectrum allocation in cloud assisted cognitive radio networks," in *2017 IEEE*

*Region* 10 *Humanitarian Technology Conference (R10HTC)*, 2017, pp. 598-601.

[28] J. Cho and J. Kim, "Performance Comparison of Heuristic Algorithms for UAV Deployment with Low Power Consumption," in 2018 *International Conference on Information and Communication Technology Convergence (ICTC)*, 2018, pp. 1067-1069.

[29] W. Fawaz, C. Abou-Rjeily, and C. Assi, "UAV-aided cooperation for FSO communication systems," *IEEE Communications Magazine*, vol. 56, no. 1, pp. 70-75, 2018.

[30]H. Safi, A. Dargahi, and J. Cheng, "Spatial beam tracking and data detection for an FSO link to a UAV in the presence of hovering fluctuations," *arXiv preprint arXiv: 1904.03774*, 2019.

[31]B. Galkin, J. Kibilda, and L. A. DaSilva, "Backhaul for low-altitude UAVs in urban environments," in 2018 *IEEE International Conference on Communications (ICC)*. IEEE, 2018, pp. 1-6.

[32]A. M. Hayajneh, S. A. R. Zaidi, D. C. McLernon, M. Di Renzo, and M. Ghogho, "Performance analysis of UAV enabled disaster recovery networks: A stochastic geometric framework based on cluster processes," *IEEE Access*, vol. 6, pp. 26215-26230, 2018.

[33]Z. Zhao, Z. Zhang, J. Tan, Y. Liu, and J. Liu, "200 gb/s fso wdm communication system empowered by multi-wavelength directly modulated tosa for 5g wireless networks," *IEEE Photonics Journal*, vol. 10, no. 4, pp. 1-8, 2018.

[34]A. S. Hamza, J. S. Deogun, and D. R. Alexander, "Classification framework for free space optical communication links and systems," *IEEE Communications Surveys & Tutorials*, vol. 21, no.2, pp. 1346-1382, 2018.

[35]Z. Cao, X. Zhang, G. Osnabrugge, J. Li, I. M. Vellekoop, and A. M. Koonen, "Reconfigurable beam system for non-line-of-sight free-space optical communication," *Light: Science & Applications*, vol. 8, no. 1, pp. 1-9, 2019.

[36] M. Janecek and W. W. Moses, "Optical reflectance measurements for commonly used reflectors," *IEEE transactions on nuclear science*, vol. 55, no. 4, pp. 2432-2437, 2008.

[37]M. Janecek, "Reflectivity spectra for commonly used reflectors," *IEEE Transactions on Nuclear Science*, vol. 59, no. 3, pp. 490-497, 2012.

[38]J. J. Gray, "Johann Heinrich Lambert, mathematician and scientist, 1728-1777," *Historia mathematica*, vol. 5, no. 1, pp. 13-41, 1978.

[39]I. I. Kim, B. McArthur, and E. J. Korevaar, "Comparison of laser beam propagation at 785 nm and 1550 nm in fog and haze for optical wireless communications," in *Optical Wireless Communications III*, vol. 4214. International Society for Optics and Photonics, 2001, pp. 26-37.

[40]P. K. Esubonteng and R. Rojas-Cessa, "Orientation of a diffuse reflector for improved coverage in id-fsoc for vehicular communications," *Vehicular Communications*, p. 100493, 2022. [Online]. Available: https://www.sciencedirect.com/science/article/pii/S2214209622000407

[41]Y. Song, C. Zhang, and Y. Fang, "Multiple multidimensional knapsack problem and its applications in cognitive radio networks," in *MILCOM* 2008-2008 *IEEE Military Communications Conference*. IEEE, 2008, pp. 1-7.

[42]W. Shi, J. Li, W. Xu, H. Zhou, N. Zhang, S. Zhang, and X. Shen, "Multiple Drone-Cell Deployment Analyses and Optimization in Drone Assisted Radio Access Networks," *IEEE Access*, vol. 6, pp. 12518-12529, 2018.

[43] Y. Xiao, F. H. Li, K. Wu, K. K. Leung, and Q. Ni, "On optimizing backoff counter reservation and classifying stations for the ieee 802.11 distributed wireless lans," *IEEE Transactions on Parallel and Distributed Systems*, vol. 17, no. 7, pp. 713-722, 2006.

[44] P. K. Esubonteng and R. Rojas-Cessa, "STREAM: Medium access control with station presence awareness in crowded networks," *IEEE Systems Journal*, vol. 15, no. 4, pp. 5152-5161, 2021.

[45] P. K. Esubonteng, H. P. T. Nguyen, and R. Rojas-Cessa, "STAR: a carrier sense agnostic MAC scheme for a crowded NLoS-FSOC optical LAN," *J. Opt. Commun. Netw.*, vol. 14, no. 10, pp. 815-827, October 2022. [Online]. Available: http://opg.optica.org/jocn/abstract.cfm?URI=jocn14-10-815

[46] A. Zvikhachevskaya, G. Markarian, and L. Mihaylova, "Quality of service consideration for the wireless telemedicine and e-health services," in 2009 *IEEE Wireless Communications and Networking Conference*. IEEE, 2009, pp. 1-6.

[47]B. M. Bogle, W. D. Rosamond, K. T. Snyder, and J. K. Zegre-Hemsey,` "The case for drone-assisted emergency response to cardiac arrest: an optimized statewide deployment approach," *North Carolina medical journal*, vol. 80, no. 4, pp. 204-212, 2019.

[48] J. Yao, Y. Dai, Y. Ni, J. Wang, and J. Zhao, "Deep characteristics analysis on travel time of emergency traffic." *Int. J. Comput. Sci. Eng.*, vol. 22, no. 1, pp. 162-169, 2020.

[49] T. Chen, J. He, H. Zhu, L. Cai, P. Yue, and J. Wang, "Resource allocation in drone-assisted emergency communication systems," in *IEEE INFOCOM*2020-*IEEE Conference on Computer Communications Workshops (INFOCOM WKSHPS)*. IEEE, 2020, pp. 132-137.

[50]N. Saputro, K. Akkaya, R. Algin, and S. Uluagac, "Drone-assisted multipurpose roadside units for intelligent transportation systems," in 2018 *IEEE* 88*th Vehicular Technology Conference (VTC-Fall)*. IEEE, 2018, pp. 1-5.

What is claimed is:

1. A network system to provide high-bandwidth wireless communication, comprising:
an optical base station having a diffuse reflector;
one or more receiving stations for receiving and transmitting a high bandwidth wireless signal to the optical base station using nondirect line-of-sight free space optical communication (NLoS-FSOC); and
a relay in communication with the optical base station and the one or more receiving stations to form a network,
wherein the one or more receiving stations communicate with the relay via a first NLoS-FSOC link, and the relay communicates with the optical base station via a second NLoS-FSOC link
further comprising a modulator at the optical base station and a plurality of antennas, the modulator and plurality of antennas providing for communications at tens of gigabits per second.

2. A method for high-speed communications, comprising:
providing a relay configured for NLoS-FSOC;
communicating between the relay and one or more receiving stations using a first NLoS-FSOC link; and
communicating between the relay and an optical base station using a second NLoS-FSOC link,
wherein the relay is either a drone having a diffuse reflector or an object having diffuse reflector material,
wherein the relay is the drone and the method further includes:
flying the drone to a geographical point; and transmitting and receiving a signal whether the drone is still flying or landed, and wherein the drone projects light to the diffuse reflector to generate a transmission from the drone to one or more of the receiving stations.

3. A method for high-speed communications, comprising:

providing a relay configured for NLoS-FSOC;

communicating between the relay and one or more receiving stations using a first NLoS-FSOC link; and communicating between the relay and an optical base station using a second NLoS-FSOC link, wherein the step of providing a relay comprises providing at least one drone as the relay, and wherein the drone has one or more diffuse reflectors and wherein the drone projects a light beam to the one or more diffuse reflectors to generate a transmission to one or more of the receiving stations or to the optical base station.

\* \* \* \* \*